(12) United States Patent
Baeuml et al.

(10) Patent No.: US 10,269,511 B2
(45) Date of Patent: Apr. 23, 2019

(54) SWITCHING CIRCUIT WITH TWO LOAD TAP CHANGERS, ELECTRICAL ASSEMBLY WITH SUCH A SWITCHING CIRCUIT, AND USE THEREOF

(71) Applicant: Maschinenfabrik Reinhausen GmbH, Regensburg (DE)

(72) Inventors: Gerhard Baeuml, Regenstauf (DE); Stanislav Sheiko, Dachau (DE); Matthias Spaeth, Regensburg (DE); Dazhong Shen, Neutraubling (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 50 days.

(21) Appl. No.: 14/894,403

(22) PCT Filed: Apr. 24, 2015

(86) PCT No.: PCT/EP2015/058976
§ 371 (c)(1),
(2) Date: Nov. 27, 2015

(87) PCT Pub. No.: WO2015/193011
PCT Pub. Date: Dec. 23, 2015

(65) Prior Publication Data
US 2017/0154738 A1 Jun. 1, 2017

(30) Foreign Application Priority Data
Aug. 22, 2014 (DE) .................. 10 2014 012 266

(51) Int. Cl.
*H01F 29/02* (2006.01)
*H01H 9/00* (2006.01)
(Continued)

(52) U.S. Cl.
CPC .......... *H01H 9/0016* (2013.01); *H01F 29/04* (2013.01); *H01H 9/0044* (2013.01); *H02P 13/06* (2013.01)

(58) Field of Classification Search
CPC .......... H01F 27/04; H01F 27/09; H01F 29/04; H01F 29/00; H01F 29/02; H01F 29/025; H01H 9/0016; H02P 13/06
(Continued)

(56) References Cited

U.S. PATENT DOCUMENTS 3,200,325 A * 8/1965 Takeda .................. H01F 29/04
                                              323/340
3,603,971 A * 9/1971 Woschetzky ............ H03M 1/74
                                              323/255
(Continued)

FOREIGN PATENT DOCUMENTS

DE          1950466 A       4/1971

*Primary Examiner* — Mang Tin Bik Lian
(74) *Attorney, Agent, or Firm* — Andrew Wilford

(57) ABSTRACT

A circuit (15) for an electrical plant (10) with a first and a second control winding (11, 13) comprises
a first on-load tap changer (16) with a first diverter terminal (161) and three first switch terminals (162), of which at least two can be connected with associated first taps (12) of the first control winding (11); and
a second on-load tap changer (17) with a second diverter terminal (171) and three second switch terminals (172) of which at least two can be connected with associated second taps (14) of the second control winding (13);
wherein
the second diverter terminal (171) is connected with the first diverter terminal (161) or with a first switch terminal (162") not associated with the first tap (12).

12 Claims, 17 Drawing Sheets

(51) Int. Cl.
*H01F 29/04* (2006.01)
*H02P 13/06* (2006.01)

(58) Field of Classification Search
USPC ....... 336/150, 137, 138, 140, 145–147, 149, 336/192; 323/340; 218/40; 200/500 R
See application file for complete search history.

(56) References Cited

U.S. PATENT DOCUMENTS

| | | | |
|---|---|---|---|
| 4,160,224 A * | 7/1979 | Owen | H01H 9/0005 |
| | | | 200/11 TC |
| 4,201,938 A * | 5/1980 | Neumann | H01F 29/04 |
| | | | 323/343 |
| 9,030,175 B2 | 5/2015 | Wrede | |
| 2013/0057248 A1 | 3/2013 | Albrecht | |
| 2013/0249528 A1 | 9/2013 | Biskoping | |
| 2014/0077913 A1* | 3/2014 | Weber | H01F 29/02 |
| | | | 336/170 |
| 2014/0176273 A1* | 6/2014 | Elick | H01H 3/605 |
| | | | 336/150 |
| 2014/0197816 A1 | 7/2014 | VonBloh | |
| 2014/0354390 A1 | 12/2014 | Engel | |
| 2015/0027989 A1 | 1/2015 | Bieringer | |

* cited by examiner

FIG. 8
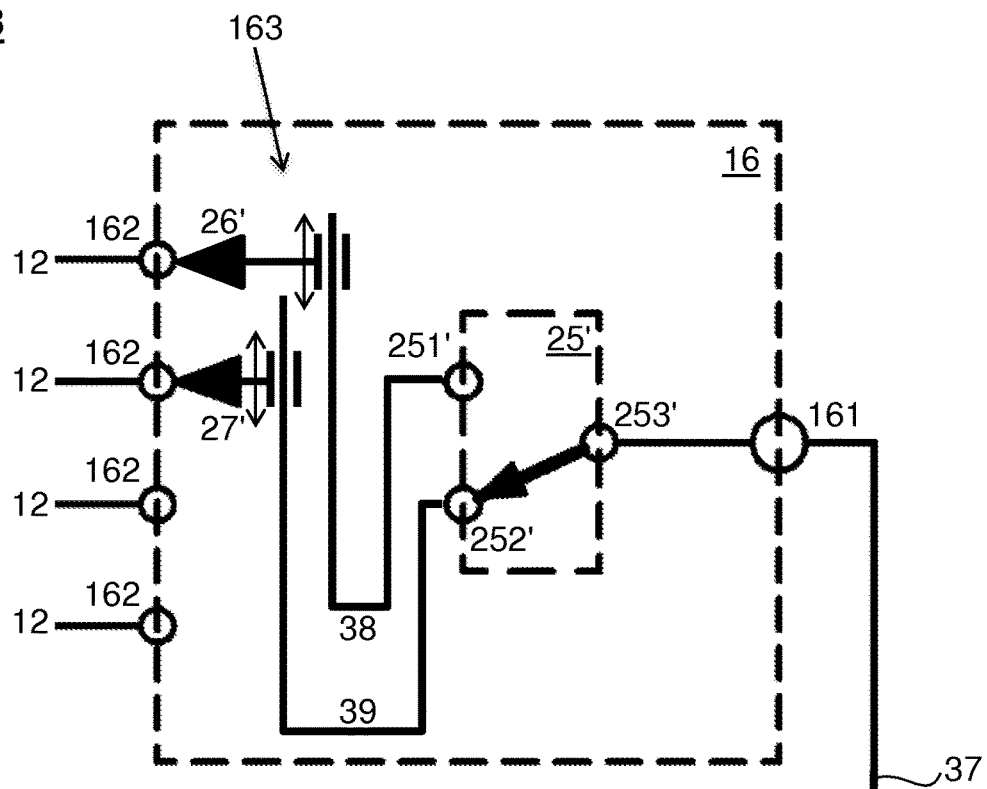
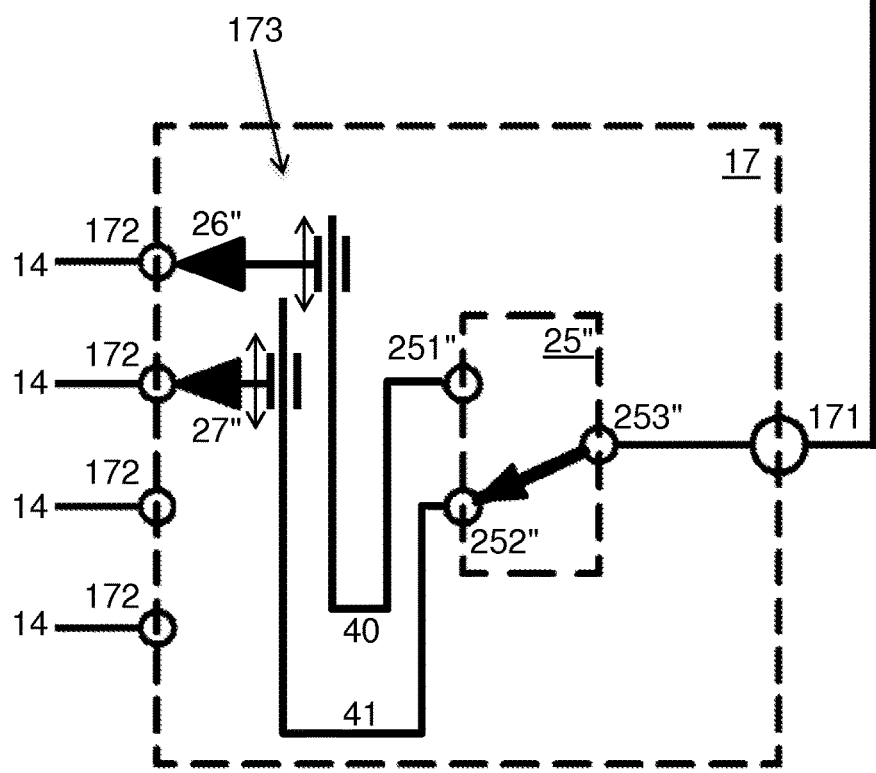

FIG. 9
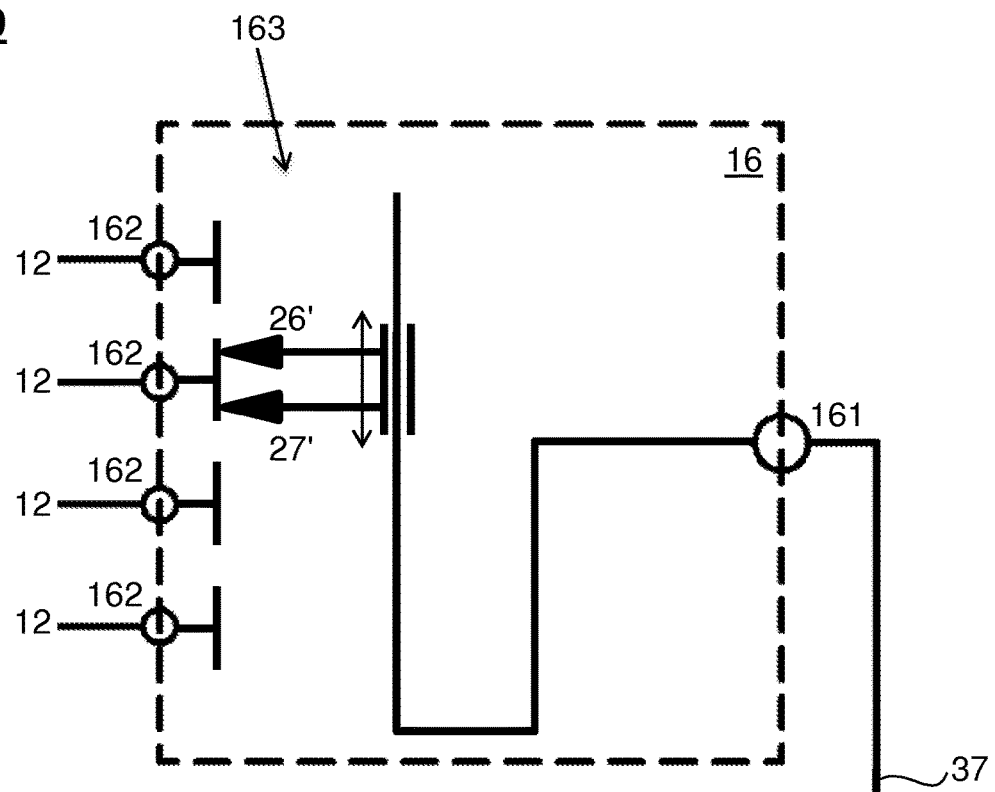
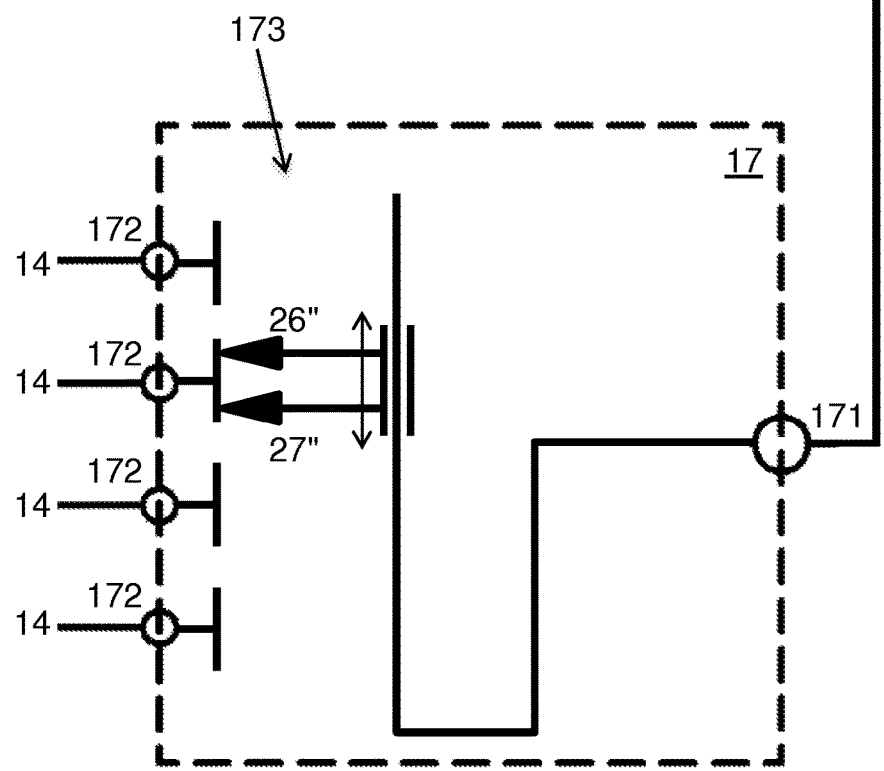

SWITCHING CIRCUIT WITH TWO LOAD TAP CHANGERS, ELECTRICAL ASSEMBLY WITH SUCH A SWITCHING CIRCUIT, AND USE THEREOF

CROSS REFERENCE TO RELATED APPLICATIONS

This application is the US-national stage of PCT application PCT/EP2015/058976 filed 24 Apr. 2015 and claiming the priority of German patent application 102014012266.2 itself filed 22 Aug. 2014.

The invention relates to a circuit with two on-load tap changers, to an electrical plant with two control windings and such a circuit, to the use of such a circuit and to the use of such a plant.

DE 19 50 466 describes a controllable choke coil comprising a main winding, a fine tapped winding with a plurality of individual taps, a tap changer and, between each two adjacent individual taps, a connecting switch to be switched in a state free of load current. Each connecting switch can either connect the two respective individual taps in series or connect at one end with the end of the main winding.

It is also known to connect a control winding in series with a main winding in a regulating transformer, wherein the taps of the control winding are selected by an on-load tap changer.

Against this background the invention proposes the subjects of the independent claims. Advantageous developments and embodiments of the invention are described in the dependent claims. In the following, a formulation of the kind "A is coupled to B" corresponds with a formulation of the kind "A is connected with B", a formulation of the kind "A is connected with B" embraces the meanings "A is directly electrically conductively connected with B" and "A is indirectly, thus via C, electrically conductively connected with B", and a formulation of the kind "A is attached to B" has the meaning "A is directly electrically conductively connected with B".

According to a first aspect, the invention proposes a circuit for an electrical plant with a first and a second control winding, comprising
  a first on-load tap changer with a first diverter terminal and at least three first switch terminals, of which at least two are or can be connected with associated first taps of the first control winding; and
  a second on-load tap changer with a second diverter terminal and at least three second switch terminals of which at least two are or can be connected with associated second taps of the second control winding;
wherein
  the second diverter terminal is connected with the first diverter terminal or with a first switch terminal that is not associated with a first tap.

In the following, that first switch terminal that is connected with the second switch terminal is also termed "connecting terminal" or "first connecting terminal", each first switch terminal that is associated with one of the first taps is also termed "first step terminal" and each second switch terminal that is associated with one of the second taps is also termed "second step terminal".

Thus, in the proposed circuit at least two of the first switch terminals are also first step terminals and at least two of the second switch terminals are also second step terminals. Moreover, the second diverter terminal is indirectly or directly electrically conductively connected with the first diverter terminal or with the first connecting terminal. In the first case of connection of the second diverter terminal with the first diverter terminal a first connecting terminal is not required, so that not only at least two, but also at least three or all first switch terminals can be first step terminals. In the second case of connection of the second diverter terminal with the first connecting terminal, one of the first switch terminals has to be the first connecting terminal so that at most the remaining first switch terminals can be first step terminals.

The proposed circuit makes it possible for at least a part of the first control winding and at least a part of the second control winding to be selectably connected in series or at least a part of the first control winding and/or at least a part of the second control winding to be bridged over and thus enables a significant extension of the regulating range and/or increase in the step number without the on-load tap changer having to be designed for correspondingly higher voltages and/or currents.

Thus, for example, in an extreme setting of the circuit the on-load tap changer can serially connect only a minimum winding range of the first control winding with a minimum winding range of the second control winding, which overall leads to a minimum effective control winding count, thus the number of windings o/ the control windings conducting or able to conduct current. The circuit can even completely bridge over both control windings, which leads to an effective control winding count equal to zero. In another extreme setting of the circuit, the on-load tap changers, by example, tap off the maximum complete winding range at each control winding and connect these ranges in series.

The proposed circuit can be constructed in any desired mode and manner according to requirements, for example
  single-phase or multi-phase, particularly two-phase or three-phase;
  and/or in such a way that it comprises at least one or no additional on-load tap changer.

Each on-load tap changer can be constructed in any desired mode and manner according to requirements, for example
  single-phase or multi-phase, particularly two-phase or three-phase;
  and/or as an on-load tap changer with mechanical switching contacts and/or
  vacuum interrupters and/or semiconductor switches; and/or
  as in DE 10 2009 043 171 [U.S. Pat. No. 9,080,175] or DE 10 2010 019 948 [US 2013/0057248] or DE 10 2012 103 489 [US 2015/0027989] or WO 2012 079 666 [US 2013/0249528] or DE 10 2011 010 388 [US 2014/0197816] or DE 10 2011 012 080 [US 2014/0354390]; and/or
  as a load selector or as a load switch or as an on-load tap changer with a selector and/or load changeover switch; and/or
  in such way that it
    is constructionally identical with or different from at least one of the other on-load tap changers; and/or
    comprises at least one additional switch terminal and/or at least one additional step terminal; and/or
    is or can be actuated and/or switched and/or controlled dependently on or independently of at least one of the other on-load tap changers.

Each terminal can be constructed in any desired mode and manner according to requirements, for example as a fixed contact or other connector.

Preferably, it is provided or specified that
the circuit is associated with an individual phase of the electrical plant; and/or
the on-load tap changers are associated with the same or an individual phase of the electrical plant and/or are associated with the same or an individual magnetic circuit; and/or
the second diverter terminal is connected only or exclusively with the first diverter terminal or with the first connecting terminal; and/or
the connection of the second diverter terminal with the first diverter terminal or with the first connecting terminal has no branching; and/or
the second diverter terminal is serially connected with the first diverter terminal or with the first connecting terminal; and/or
the on-load tap changers are serially connected by the connection of the second diverter terminal with the first diverter terminal or with the first connecting terminal; and/or
the indirect connection of the second diverter terminal with the first diverter terminal or with the first connecting terminal takes place by an electrical double-pole that comprises, for example at least one resistance and/or at least one inductance and/or at least one capacitor and/or at least one switch; and/or
the indirect connection of the second diverter terminal with the first diverter terminal or with the first connecting terminal is not effected by one of the windings of the electrical plant and/or not by one of the on-load tap changers.

According to a first alternative it can be provided or specified that the second diverter terminal is connected with the first diverter terminal.

According to a second alternative it can be provided or specified that the second diverter terminal is connected with the first connecting terminal.

The first diverter terminal can then be connected, for example, with ground or with earth ground potential or with a star point or with an apex of a triangular circuit or with a plant terminal of the electrical plant or with a diverter of the electrical plant or with a mains line of an alternating current mains. The diverter in turn can be connected, for example, with ground or earth potential or a star point or an apex of a triangular circuit.

The mains line can be constructed in any desired mode and manner according to requirements and, for example, be associated with phase of the alternating current mains or as a neutral line of a neutral point or star point of the alternating current mains.

If the alternating current mains has more than one phase, then, for example, the proposed circuit can correspondingly be of multi-phase construction. Alternatively, for example, for each phase one of the proposed circuits can be provided or present in single-phase format that is or can be connected with the respective mains line.

It can be provided or specified that the circuit comprises
a third on-load tap changer with a third diverter terminal and three third switch terminals, of which at least two can be connected with associated third taps of a third control winding of the electrical plant;
wherein
the second diverter terminal is connected with the first switch terminal not associated with a first tap; and
the first diverter terminal is connected with the third diverter terminal or with a third diverter terminal that is not associated with a third tap.

It can be provided or specified that at least one of the on-load tap changers comprises a preselector with two preselector terminals and a base terminal.

It can be provided or specified that
at least one of the preselectors is constructed as a reverser;
the preselector terminals can be connected with the ends of the control winding that is associated with the respective on-load tap changer; and
the base terminal can be connected with a first plant terminal of the plant or with an end of a main winding inductively coupled with this control winding.

It can be provided or specified that
at least one of the preselectors is constructed as a coarse selector;
the base terminal can be connected with an end of the control winding associated with the respective on-load tap changer; and
the preselector terminals can be connected with the ends of a coarse winding that is inductively coupled with this control winding and, in particular, electrically isolated therefrom.

It can be provided or specified that at least two on-load tap changers are coupled in such a way that they switch in the same sense and, in particular, synchronously.

In that case, "switch in same sense" means that each of the coupled on-load tap changers increases or reduces the effective of winding count with respect to the magnetic flux.

Preferably it is specified that the first and second on-load tap changers are combined in common switching apparatus or are realized or formed by common switching apparatus.

The switching apparatus is preferably constructed in accordance with the fifth aspect.

Preferably it is specified that the switching apparatus comprises a frame on which at least the first and second on-load tap changers are mounted.

Preferably it is specified that
the first on-load tap changer comprises a first load changeover switch and a first selector;
the second on-load tap changer comprises a second load changeover switch and a second selector;
the frame comprises an on-load tap changer frame and a selector frame; and
the load changeover switches are mounted on the load changeover switch frame and the selectors are mounted on the selector frame.

According to a second aspect the invention proposes an electrical plant comprising
a first control winding with at least two first taps;
a second control winding with at least two second taps; and
a circuit that is constructed in accordance with the first aspect and/or that comprises
a first on-load tap changer with a first diverter terminal and at least three first switch terminals, of which at least two are connected with associated first taps; and
a second on-load tap changer with a second diverter terminal and at least three second switch terminals, of which at least two are connected with associated second taps of the second control winding;
wherein
the second diverter terminal is connected with the first diverter terminal or with a first switch terminal not associated with a first tap.

The proposed plant can be constructed in any desired mode and manner according to requirements, for example single-phase or multi-phase, particularly two-phase or three-phase;

and/or in such a way that it comprises at least one or no additional control winding and/or at least one main winding and/or at least one coarse winding.

If the plant is of multi-phase construction, then, for example, the circuit can similarly be of corresponding multi-phase construction. Alternatively, for example, a single-phase circuit can be provided or present for each phase. Several single-phase circuits can be connected together, for example in a star circuit or triangular circuit.

Each control winding can be constructed in any desired mode and manner according to requirements, for example in such a way that it
- forms a separate winding or a part or section of an overall winding that, in particular, also comprises at least one of the other control windings and/or at least one main winding; and/or
- is electrically isolated from the other control windings or serially connected with at least one of the other control windings; and/or
- is constructionally identical with or different from at least one of the other control windings; and/or
- comprises at least one or no additional tap.

Each circuit can be constructed in any desired mode and manner according to requirements, for example as one of the circuits proposed in accordance with the first aspect.

Preferably it is provided or specified that
- the plant has a first plant terminal that is connected with the first control winding, and a second plant terminal that is connected with the second control winding;
- in particular, the first plant terminal is connected with a first end of the first control winding and/or the second plant terminal is connected with a first end of the second control winding or with the first diverter terminal.

The plant can, for example, be connected with an alternating current mains by the plant terminals.

If the alternating current mains has more than one phase, then, for example, the proposed plant can correspondingly be of multi-phase construction and connected with a respective mains line of the alternating current mains for each phase of the corresponding plant part. Alternatively, for example, for each phase one of the proposed plants can be provided or present in single-phase construction that is or can be connected with the respective mains line.

Each diverter terminal can, for example, be connected with ground or with earth potential or with a star point or with an apex of a triangular circuit or with a plant terminal of the electrical plant or with a diverter of the electrical plant or with a mains line. The diverter can in turn, for example, be connected with ground or earth potential or a star point or an apex of a triangular circuit.

Each mains line can be constructed in any desired mode and manner according to requirements and be associated with, for example, a phase of the alternating current mains or as a neutral line with a neutral point or star point of the alternating current mains.

It can be provided or specified that the plant comprises
a third control winding with two third taps;
wherein
the second diverter terminal is connected with the first switch terminal not associated with a first tap;
the circuit comprises
a third on-load tap changer with a third diverter terminal and three third switch terminals, of which at least two are connected with associated third taps; and
the first diverter terminal is connected with the third diverter terminal or with a third switching terminal not associated with a third tap.

It can be provided or specified that the plant comprises a main winding that is inductively coupled with at least one control winding and, in particular, serially connected.

It can be provided or specified that at least one on-load tap changer comprises a preselector with two preselector terminals and a base terminal.

The preselector can be constructed in any desired mode and manner according to requirements, for example
as a reverser or coarse selector or multiple coarse selector;
and/or in such a way that it comprises at least one or no additional preselector terminal.

It can be provided or specified that
at least one preselector is constructed as a reverser;
the preselector terminals are connected with the ends of the control winding associated with the respective on-load tap changer;
the base terminal is connected with a first plant terminal of a plant or with an end of a main winding inductively coupled with this control winding.

It can be provided or specified that the plant comprises
a coarse winding that is inductively coupled to and, in particular, electrically isolated from the control winding that is associated with an on-load tap changer comprising a preselector;
wherein
this preselector is constructed as a coarse selector;
the preselector terminals are connected with the ends of the coarse winding; and
the base terminal is connected with an end of this control winding.

It can be provided or specified that
in the case of at least one of the control windings the area of the line cross-section is constant; and/or
at least two control windings are inductively coupled and/or conduct the same or an individual magnetic flux and/or are associated with the same or an individual phase and/or are seated on a common magnet core and/or are associated with the same or an individual magnetic circuit; and/or
the control windings are connected in series by the on-load tap changers.

It can be provided or specified that the plant is constructed as a compensating choke or forms at least a part of a compensating choke.

It can be provided or specified that the plant is constructed as a regulating transformer with a primary side and a secondary side or forms at least a part of a regulating transformer with a primary side and a secondary side, wherein the control windings form at least a part of the primary side or secondary side.

It can be provided or specified that the regulating transformer is constructed as a current rectifying transformer.

Current rectifying transformers, also termed high-voltage direct-current transforming transformers, are used in current rectifying stations in which in the case of high-voltage direct-current transformation, conversion of three-phase current into direct current and conversely takes place.

According to a third aspect the invention proposes use of a circuit that is constructed in accordance with the first aspect, for controlling with or without feedback and/or setting and/or switching an electrical plant that comprises a first and a second control winding and that, in particular, is constructed in accordance with the second aspect.

It can be provided or specified that the controlling with or without feedback and/or setting and/or switching is carried out in such a way that in the case of each control winding the effective control winding count is changed; and/or the plant is constructed as a compensating choke or as a regulating transformer or as a current rectifying transformer.

According to a fourth aspect the invention proposes use of an electrical plant that is constructed in accordance with the second aspect, as a compensating choke or regulating transformer or direct current transformer.

According to a fifth aspect the invention proposes switching apparatus for an electrical plant with a first and a second control winding, comprising a circuit that is constructed in accordance with the first aspect.

Preferably, it is specified that the switching apparatus comprises a frame on which at least the first and second on-load tap changers are mounted.

Preferably, it is specified that the first on-load tap changer comprises a first load changeover switch and a first selector;

the second on-load tap changer comprises a second load changeover switch and a second selector;

the frame comprises a load changeover switch frame and a selector frame; and the load changeover switches are mounted on the load changeover switch frame and the selectors are mounted on the selector frame.

According to a sixth aspect, the invention proposes use of switching apparatus in a circuit that is constructed in accordance with the first aspect, as common switching apparatus, in which the first and second on-load tap changers are combined as a constructional unit or that realizes or forms the first and second on-load tap changers.

The switching apparatus is preferably constructed in accordance with the fifth aspect.

According to a seventh aspect the invention proposes use of switching apparatus that is constructed in accordance with a fifth aspect, for producing a circuit that is constructed in accordance with the first aspect.

The statements and explanations with respect to one of the aspects of the invention, particularly to individual features of this aspect, correspondingly also apply in analogous manner to the other aspects of the invention.

Forms of embodiment of the invention are explained in more detail in the following by example on the basis of the accompanying drawings. However, the individual features evident therefrom are not restricted to the individual forms of embodiment, but can be connected and/or combined with further above-described individual features and/or with individual features of other forms of embodiment. The details in the drawings are to be interpreted in an explanatory, but not restrictive sense. The reference numerals contained in the claims do not restrict the scope of protection of the invention in any way, but merely refer to the forms of embodiment shown in the drawings.

In the drawings:

FIG. 8 shows a first form of embodiment of an on-load tap changer for the circuit;

FIG. 9 shows a second form of embodiment of the on-load tap changer;

Figure 1:
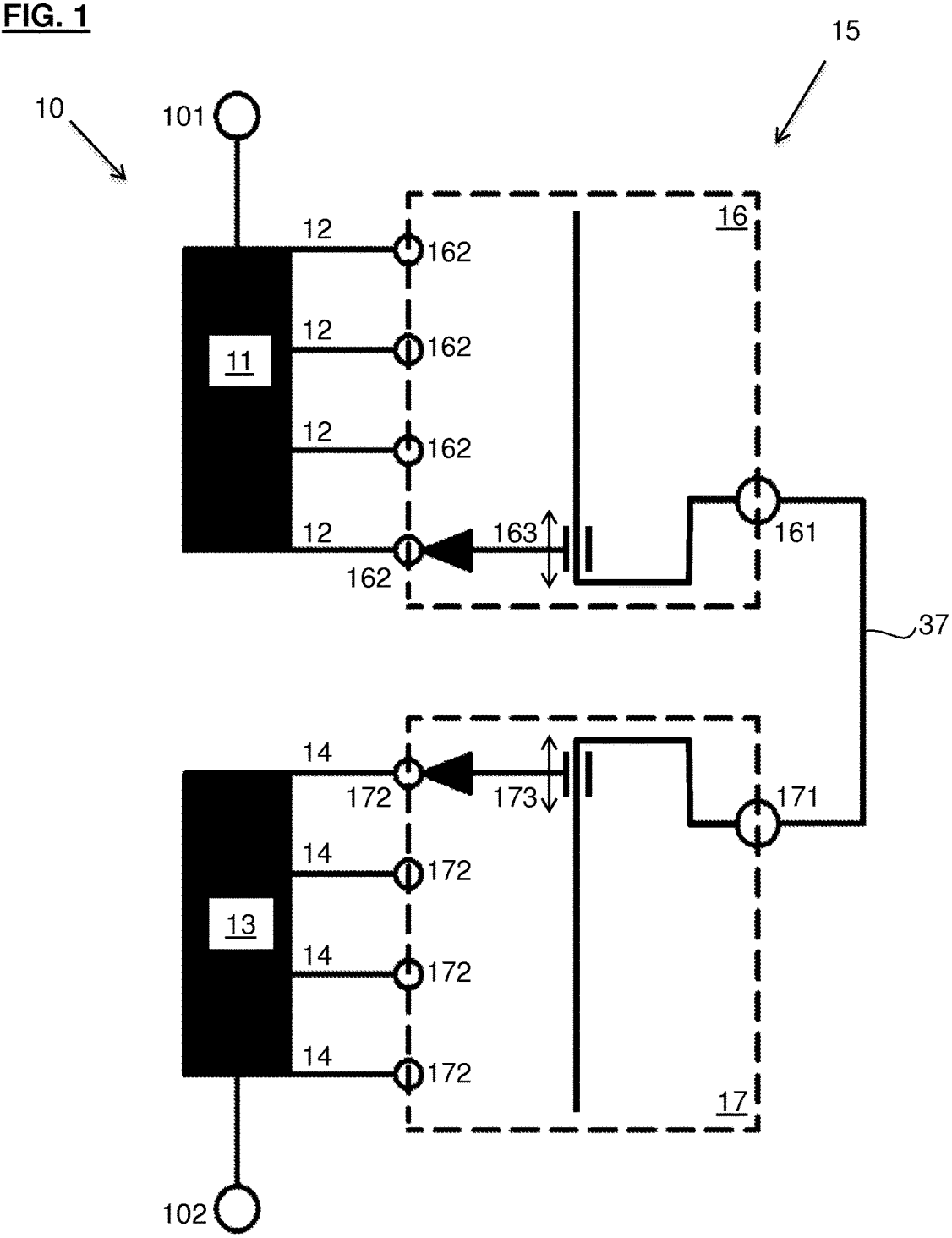
FIG. 1 shows a first form of embodiment of an electrical plant with two control windings and a first form of embodiment of a circuit.

A first form of embodiment of an electrical plant 10 is schematically illustrated in FIG. 1, which forms, for example a controllable compensation choke for providing and/or changing and/or influencing reactive power in an alternating current mains (not illustrated). The plant 10 has a first plant terminal 101 and a second plant terminal 102 that are or can be connected with mains lines (not illustrated) of the alternating current mains.

In this form of embodiment the plant 10 comprises a first control winding 11 with four first taps 12, a second control winding 13 with four second taps 14 and a circuit 15 that is constructed in accordance with a first form of embodiment.

In this form of embodiment, the circuit 15 comprises a first on-load tap changer 16 with a diverter terminal 161, also termed first diverter terminal 161, four switch terminals 162, also termed first switch terminals 162, and a moved contact system 163, also termed first moved contact system 163, as well as a second on-load tap changer 17 with a diverter terminal 171, also termed second diverter terminal 171, four switch terminals 172, also termed second switch terminal 172, and a moved contact system 173, also termed second moved contact system 173.

The first switch terminals 162 are respectively associated with the first taps 12 and directly connected therewith and are also termed first step terminals. The second switch terminals 172 are respectively associated with the second taps 14 and directly connected therewith and are also termed second step terminals. The second diverter terminal 171 is directly connected with the first diverter terminal 161.

Each moved contact system 163/173 is connected with the respective diverter terminal 161/171 and can be selectably brought into electrical contact with each of the respective step terminals 162/172.

The first tap 12 uppermost in FIG. 1 is connected with the upper, first end of the first control winding 11 and the first plant terminal 101, and the lowermost first tap 12 is connected with the lower, second end of the first control winding 11 or forms this second end. The lowermost second tap 14 is connected with the lower, first end of the second control winding 13 and with the second plant terminal 102, and the uppermost second tap 14 is connected with the upper, second end of the second control winding 13 or forms this second end.

Between the first end of the control winding 11 and the first plant terminal 101 and/or between the first end of the second control winding 13 and the second plant terminal 102 a respective at least one main winding (not illustrated) and/or at least one additional control winding (not illustrated) can, for example, be serially connected.

In this form of embodiment, the control windings 11, 13 are electrically isolated from one another and seated on a common magnet core (not illustrated) so that they are inductively coupled and conduct the same magnetic flux.

In this form of embodiment the control windings 11, 13 are constructionally identical and the on-load tap changers 16, 17 are coupled in such a way they switch in the same sense and synchronously. This means that the movement contact systems 163, 173 simultaneously move towards the first or second end of the respective control winding 11, 13. If, for example, the first moved contact system 163 in FIG. 1 is moved upwardly towards the first end of the first control winding 11, then at the same time the second moved contact system 173 moves downwardly towards the first end of the second control winding 13 and vice versa.

However, it is also possible for the moved contact systems 163, 173 to be able to be moved independently of one another in time and/or in any direction.

Figure 2:
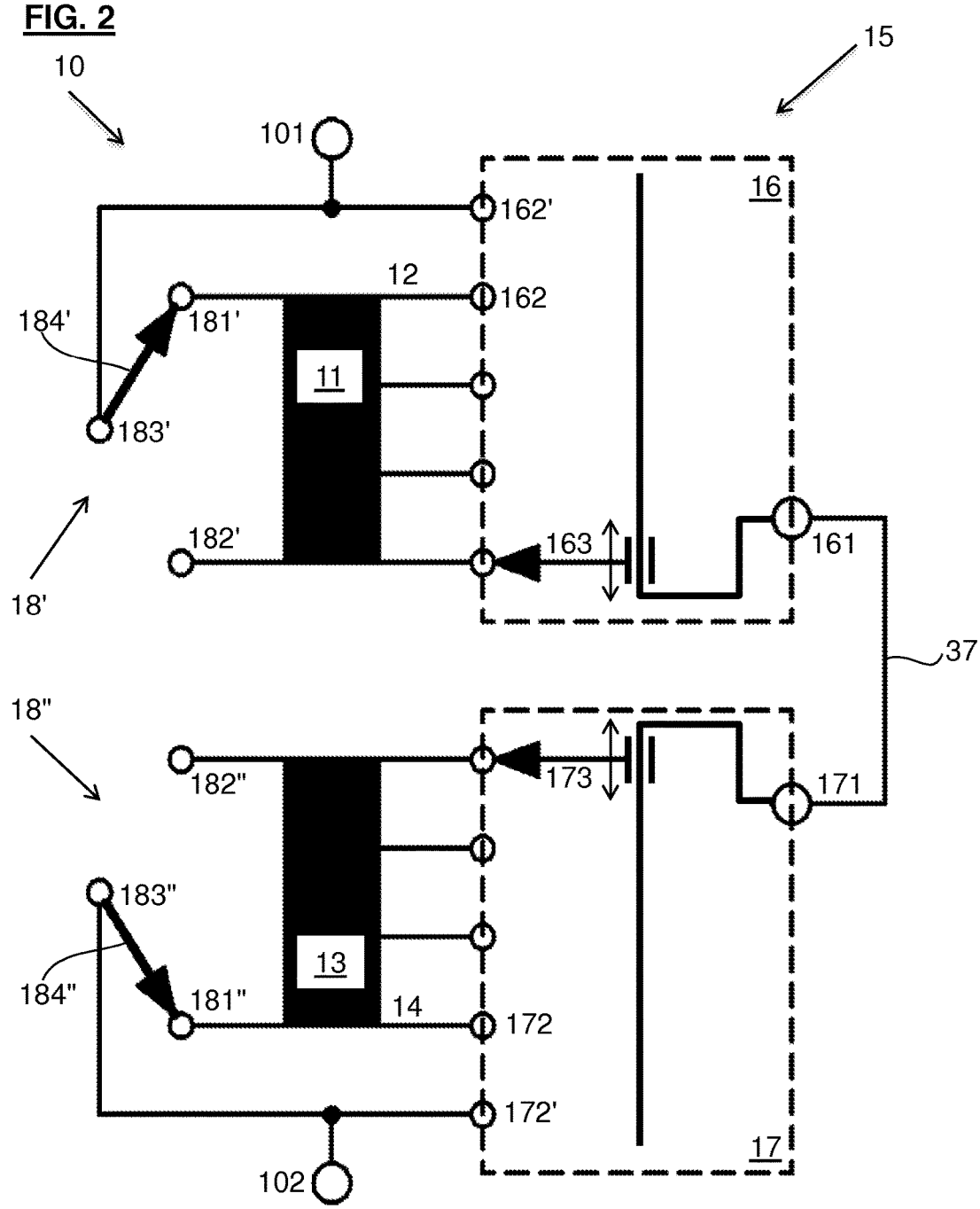
FIG. 2 shows a second form of embodiment of the plant with a second form of embodiment of the circuit.

A second form of embodiment of the plant 10 is schematically illustrated in FIG. 2. This form of embodiment is similar to the first form of embodiment of FIG. 1, so that in the following primarily the differences are explained in more detail.

In this form of embodiment the circuit 15 is constructed in accordance with a second form of embodiment that is similar to the first form of embodiment of FIG. 1 so that in the following primarily the differences are explained in more detail.

In this form of embodiment each on-load tap changer 16/17 comprises a preselector 18'/18" that is constructed as a reverser, with two preselector terminals 181'/181", 182'/182", a base terminal 183'/183" and a moved contact 184'/184" that is connected with the respective base terminal 183'/183" and can be selectably brought into electrical contact with each of the respective preselector terminals 181'/181", 182'/182". In each on-load tap changer 16/17 the first preselector terminal 181'/181" is directly connected with the first end of the respective control winding 23/24, the second preselector terminal 182'/182" is directly connected with the second end of the respective control winding 23/24 and the base terminal 183'/183" is directly connected with the respective plant terminal 101/102.

This form of embodiment allows switching-over of the connecting direction of each of the control windings 23, 24 and also bridging-over thereof.

Each on-load tap changer 16/17 preferably comprises an additional switch terminal 162'/172' that can be contacted by the respective moved contact system 163/173 and is connected with the respective base terminal 183, but not with one of the respective taps 12/14. These additional switch terminals are also termed commutation terminals 162'/172'.

Figure 3:
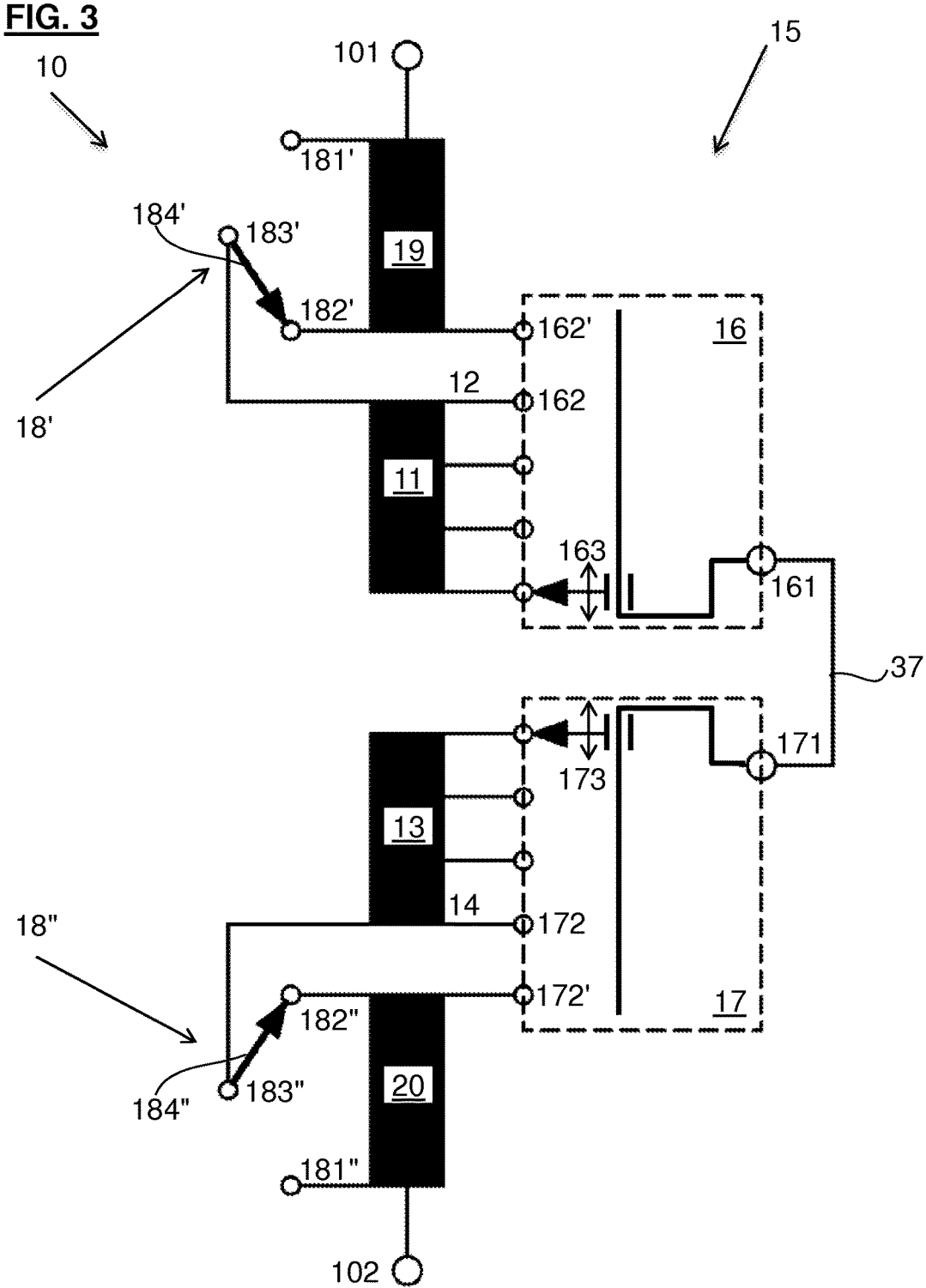
FIG. 3 shows a third form of embodiment of the plant with a third form of embodiment of the circuit.

A third form of embodiment of the plant 10 is schematically illustrated in FIG. 3. This form of embodiment is similar to the second form of embodiment of FIG. 2 so that in the following primarily the differences are explained in more detail.

In this form of embodiment the plant 10 comprises a first coarse winding 19 that is inductively coupled with the first control winding 11 and electrically isolated therefrom, and a second coarse winding 20 that is inductively coupled with the second control winding 13 and electrically isolated therefrom. The first end that is upper in FIG. 3, of the first coarse winding 19 is connected with the first plant terminal 101 and the lower, second end of the coarse winding 19 is connected with the first commutation terminal 162'. The lower, first end of the second coarse winding 20 is connected with the second plant terminal 102 and the upper, second end of the second coarse winding 20 is connected with the additional second commutation terminal 172'.

In this form of embodiment the circuit 15 is constructed in accordance with a third form of embodiment that is similar with the second form of embodiment of FIG. 2 so that in the following primarily the differences are explained in more detail.

In this form of embodiment each preselector 18'/18" is constructed as a coarse selector. In each on-load tap changer 16/17 the respective first preselector terminal 181'/181" is directly connected with the first end of the respective coarse winding 19/20, the respective second preselector terminal 182'/182" is directly connected with the second of the respective coarse winding 19/20 and the respective base terminal 183'/183" is directly connected with the first end of the respective control winding 11/13.

Figure 4:
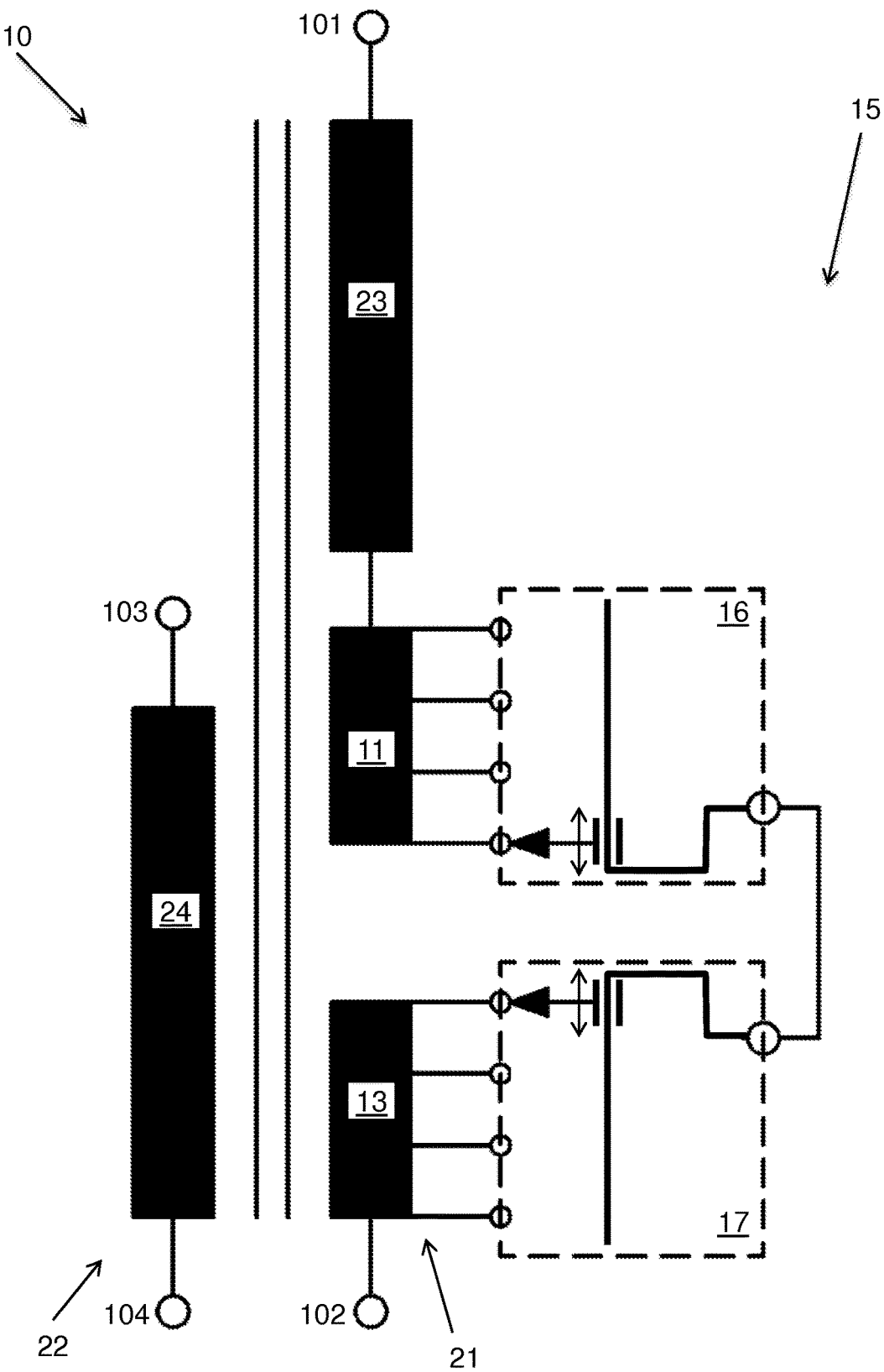
FIG. 4 shows a fourth form of embodiment of the plant.

A fourth form of embodiment of the plant 10 is schematically illustrated in FIG. 4. This form of embodiment is similar to the first form of embodiment of FIG. 1, so that in the following primarily the differences are explained in more detail.

In this form of embodiment the plant 10 forms, by example, a single-phase regulating transformer with an upper-voltage or primary side 21 and a lower-voltage or secondary side 22. The plant 10 has a third plant terminal 103 and fourth plant terminal 104 that are connected with mains lines (not illustrated) of the alternating current mains or with another alternating current mains (not illustrated). The control windings 11, 13 form a part of the primary side 21. The plant 10 comprises, on the primary side 21, a first main winding 23 that is inductively coupled and serially connected with the first control winding 11, and on the secondary side 22 a second main winding 24 that is inductively coupled with the windings 11, 13, 23 of the primary side 21 and electrically isolated therefrom. The first main winding 23 is connected in series between the first end of the first control winding 11 and the first plant terminal 101. The end that is upper in FIG. 4, of the second main winding 24 is connected with the third plant terminal 103 and the lower end with the fourth plant terminal 104.

Figure 5:
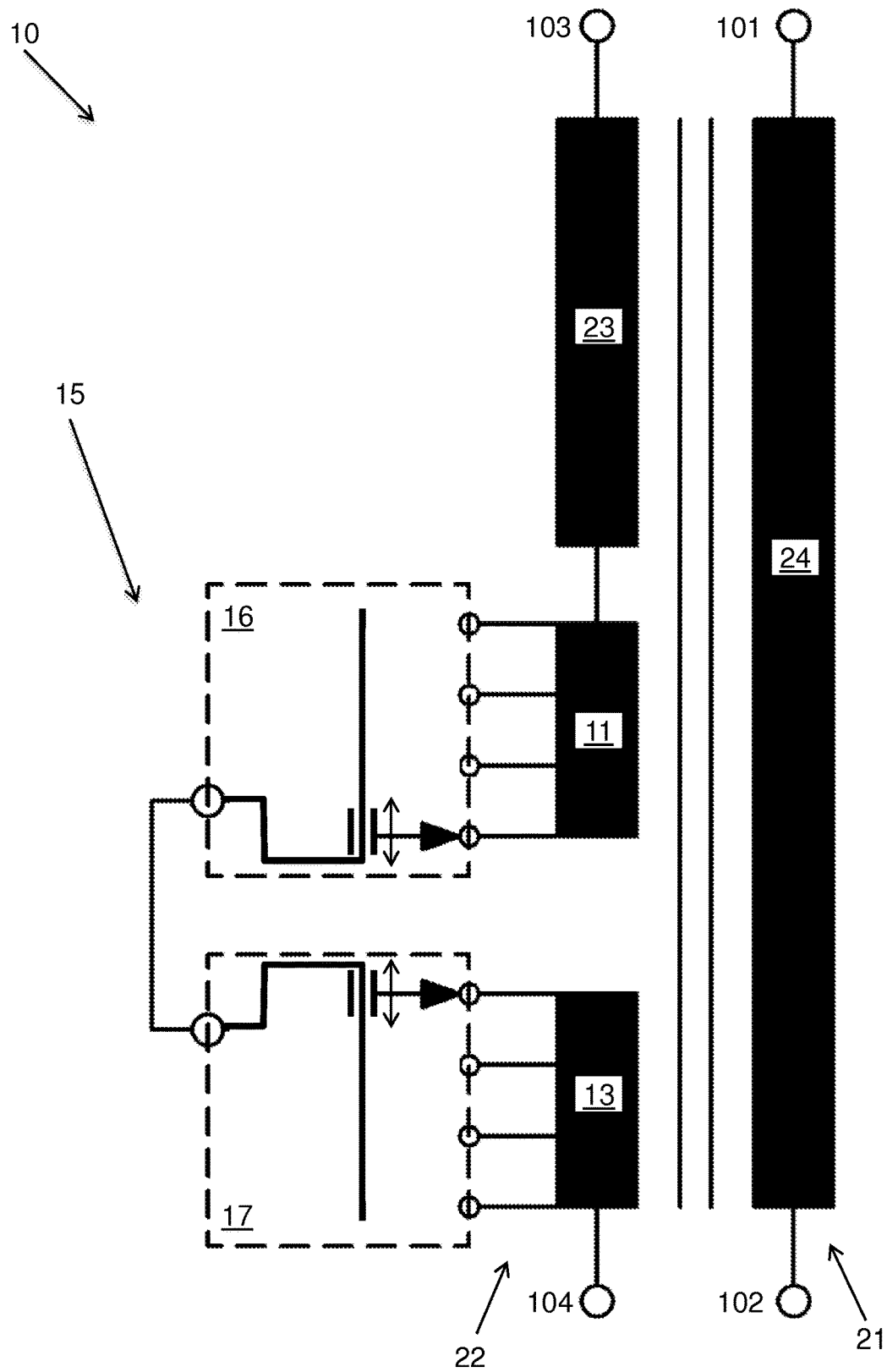
FIG. 5 shows a fifth form of embodiment of the plant.

A fifth form of embodiment of the plant 10 is schematically illustrated in FIG. 5. This form of embodiment is similar to the fourth form of embodiment of FIG. 4 so that in the following primarily the differences are explained in more detail.

In this form of embodiment the control windings 11, 13 and the first main winding 23 form the secondary side 22 and are connected not between the first and second plant terminals 101, 102, but between the third and fourth plant terminals 103, 104. The second main winding 24 forms the primary side 21 and is connected not between the third and fourth plant terminals 103, 104, but between the first and second plant terminals 101, 102.

Figure 6:
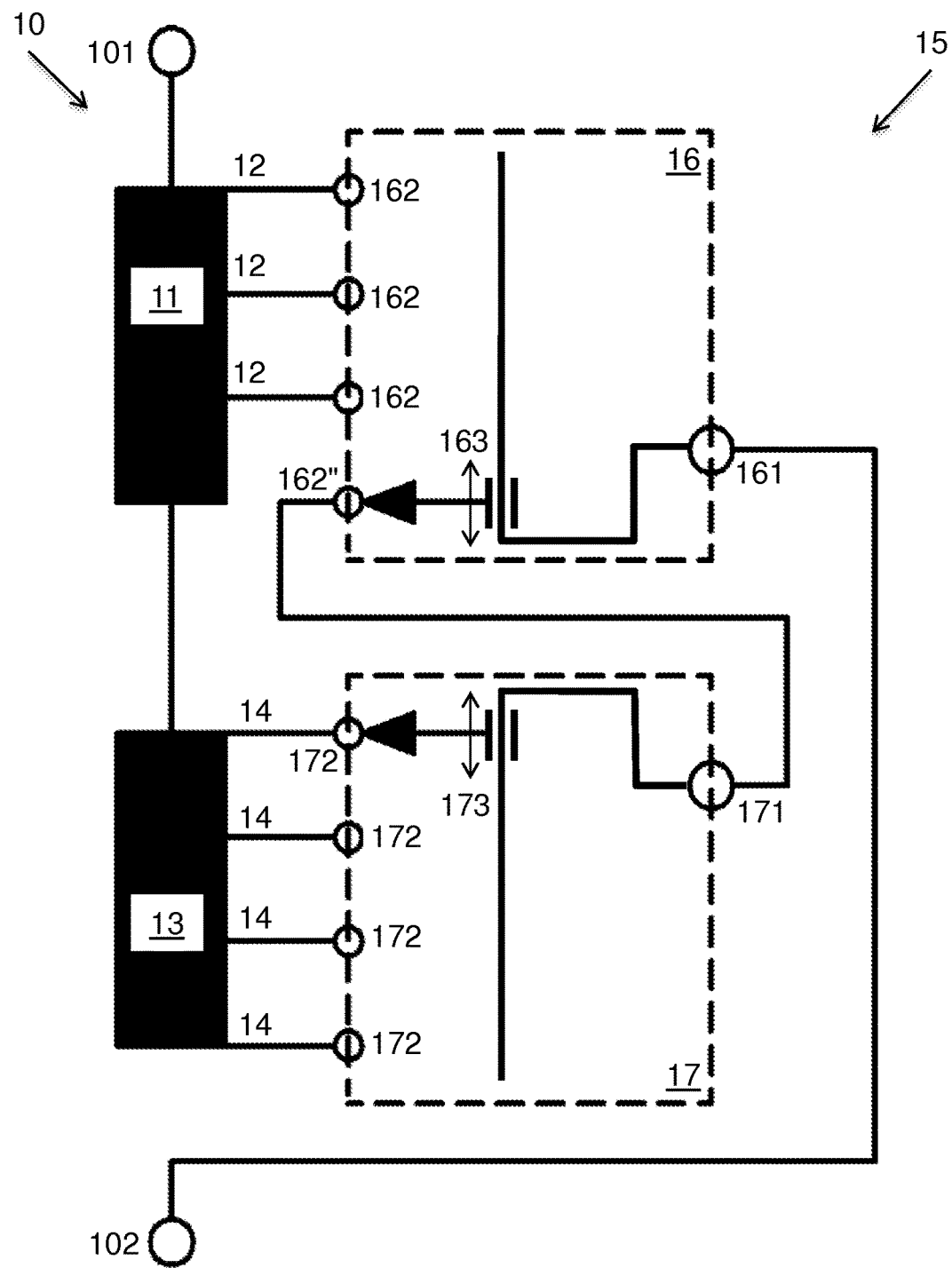
FIG. 6 shows a sixth form of embodiment of the plant with a fourth form of embodiment of the circuit.

A sixth form of embodiment of the plant 10 is schematically illustrated in FIG. 6. This form of embodiment is similar to the first form of embodiment of FIG. 1, so that in the following primarily the differences are explained in more detail.

In this form of embodiment the lowermost, first tap 12 of the first form of embodiment is eliminated and the second end of the first control winding 11 is connected with the second end of the second control winding 13, so that the control windings 11, 13 are not electrically isolated from one another.

In this form of embodiment the circuit 15 is constructed in accordance with a fourth form of embodiment that is similar with the first form of embodiment of FIG. 1 so that in the following primarily the differences are explained in more detail.

In this form of embodiment the first that is lowermost in FIG. 6, switch terminal 162" is not directly connected with a first tap 12 and therefore forms a first connecting terminal 162". The second diverter terminal 171 is directly connected with this first connecting terminal 162" and not with the first diverter terminal 161. The first diverter terminal 161 is connected with the second plant terminal 102.

Figure 7:
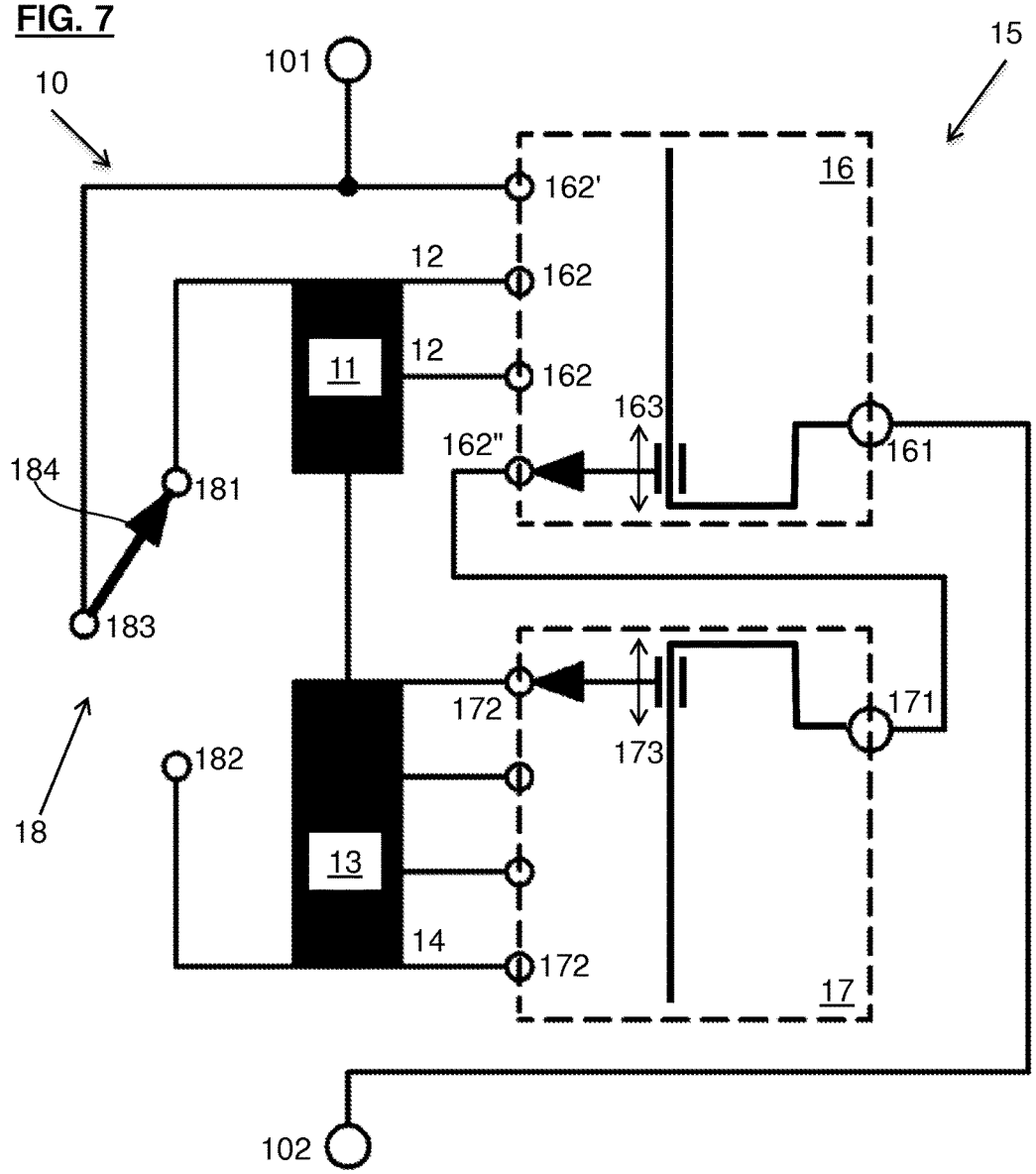
FIG. 7 shows a seventh form of embodiment of the plant with a fifth form of embodiment of the circuit.

A seventh form of embodiment of the plant 10 is schematically illustrated in FIG. 7. This form of embodiment is similar to the sixth form of embodiment of FIG. 6 so that in the following primarily the differences are explained in more detail.

In this form of embodiment the uppermost tapped winding section that is provided or present in the sixth form of embodiment, of the first control winding 11 that lies between the two first winding taps 12 uppermost in FIG. 6, as well as the uppermost first tap 12 are eliminated.

In this form of embodiment the circuit 15 is constructed in accordance with a fifth form of embodiment that is similar with the fourth form of embodiment of FIG. 6, so that in the following primarily the differences are explained in more detail.

In this form of embodiment the uppermost, first step terminal 162 provided or present in the fourth form of embodiment is eliminated. The circuit 15 comprises, for both on-load tap changers 16, 17 in common, a preselector 18 that is constructed as a reverser, with two preselector terminals 181, 182, a base terminal 183 and a moved contact 184. The first preselector terminal 181 is directly connected with the first end of the first control winding 23, the second preselector terminal 182 is directly connected with the first end of the second control winding 24 and the base terminal 183 is directly connected with the first plant terminal 101.

The first on-load tap changer 16 preferably comprises a commutation terminal 162' that can be contacted by the first moved contact system 163 and is connected with the base terminal 183, but not with one of the first taps 12.

In FIG. 8 a first form of embodiment of the first on-load tap changer 16 is schematically illustrated at the top. The second on-load tap changer 17 is schematically illustrated in FIG. 8 at the bottom and similarly constructed in accordance with this form of embodiment, but can also be differently constructed.

In this form of embodiment each on-load tap changer 16/17 is constructed as a load switch and comprises a load changeover switch 25'/25" with two changeover terminals 251'/251", 252'/252", a base terminal 253'/253" and a moved contact that is connected with the respective base terminal 253'/253" and can be selectably brought into electrical contact, without interruption and under load, with each of the respective changeover terminals 251'/251", 252'/252". The first moved contact system 163 is constructed as a selector and is also termed first selector 163. The second moved contact system 173 is constructed as a selector and is also termed second selector 173. Each selector 163/173 comprises two movable selector arms 26'/26", 27'/27" that can moved independently of one another. Each first selector arm 26'/26" is connected with the respective first changeover switch terminal 251'/251" and can be selectably brought into electrical contact with the—counting from the top in FIG. 8—respective first and third switch terminals 162/172. Each second selector arm 27'27" is connected with the respective second changeover switch terminal 252'/252" and can be selectably brought into electrical contact with the respective second and fourth switch terminals 162/172.

A second form of embodiment of the first on-load tap changer 16 is schematically illustrated in FIG. 9 at the top. The second on-load tap changer 17 is schematically illustrated in FIG. 9 at the bottom and similarly constructed in accordance with this form of embodiment, but can also be differently constructed. This form of embodiment is similar to the first form of embodiment of FIG. 8, so that in the following primarily the differences are explained in more detail.

In this form of embodiment each on-load tap changer 16/17 is constructed as a load selector. The load changeover switch 25'/25" of the first form of embodiment is eliminated. In each on-load tap changer 16/17 the respective selector arms 26'/26", 27'/27" can be moved away from one another only in common and at a predetermined spacing. They are connected with the respective diverter terminal 161/171 and can be selectably brought into electrical contact, free of interruption and under load, with each of the respective switch terminals 162/172. Each switch terminal 162/172 has a contact surface facing the respective selector arm 26'/26", 27'/27". In each on-load tap changer 16/17 the spacing between the contact tips of the respective selector arms 26'/26", 27'/27" is so selected with respect to the dimensions of the contact surfaces in movement direction that in the stationary state that is illustrated in FIG. 9, the two contact tips bear against the same contact surface. The gap between each two adjacent contact surfaces is selected to be smaller than the spacing between the contact tips, so that on movement of the selector arms 26'/26", 27'/27" to an adjacent contact surface always at least one of the selector arms 26'/26", 27'/27" bears against at least one of the adjacent contact surfaces.

Figure 10:
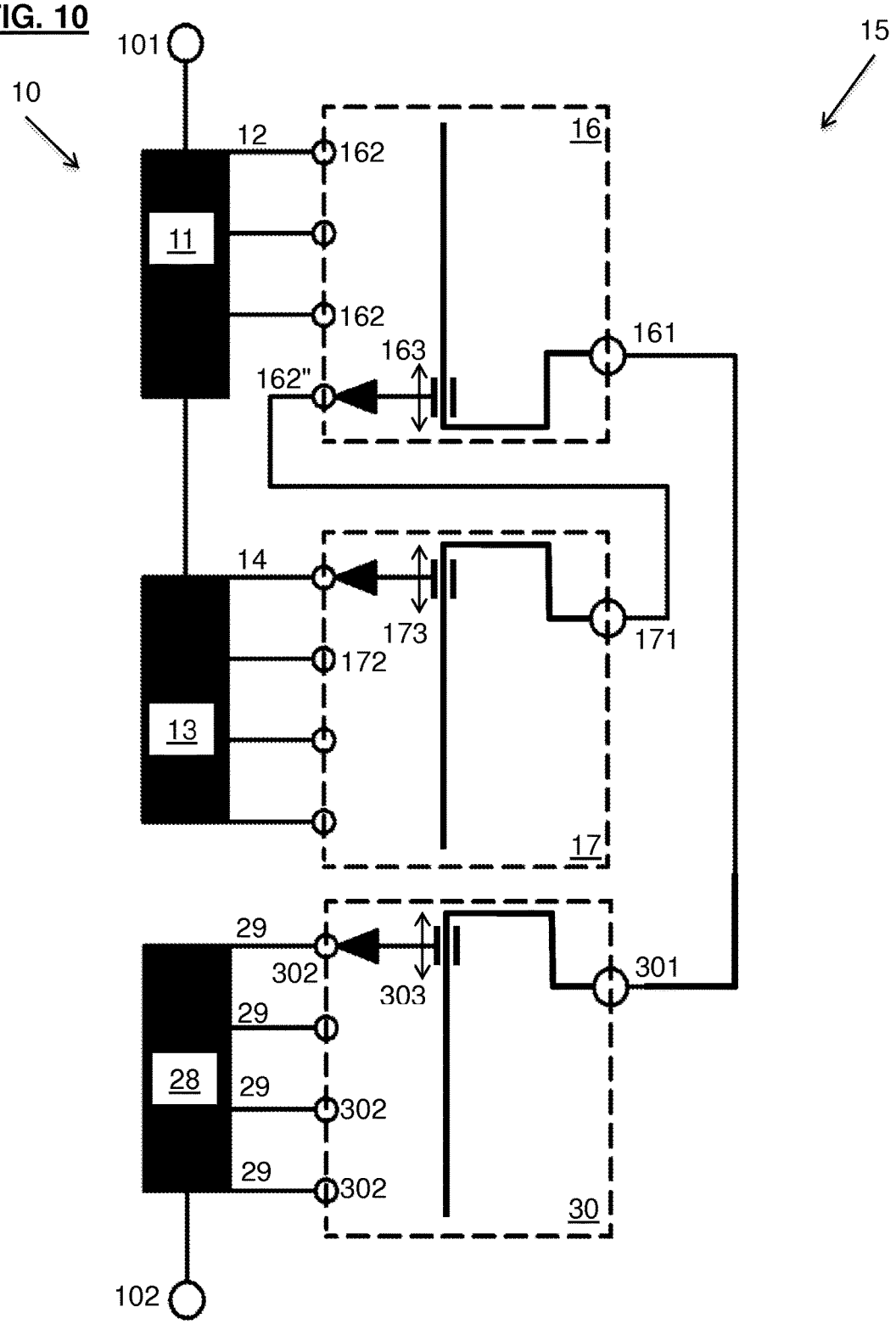
FIG. 10 shows an eighth form of embodiment of the plant with a sixth form of embodiment of the circuit.

An eighth form of embodiment of the plant 10 is schematically illustrated in FIG. 10. This form of embodiment is similar to the sixth form of embodiment of FIG. 6, so that in the following primarily the differences are explained in more detail.

In this form of embodiment the plant 10 comprises a third control winding 28 with four third taps 29, which winding is electrically isolated from the other two control windings 11, 13 and seated on the common magnet core, so that all three control windings 11, 13, 28 are inductively coupled and conduct the same magnetic flux. The first diverter terminal 161 is connected not with the second plant terminal 102, but with the first that is lower in FIG. 10, end of the third control winding 28.

In this form of embodiment the circuit 15 is constructed in accordance with a sixth form of embodiment that is similar to the fourth form of embodiment of FIG. 6, so that in the following primarily the differences are explained in more detail.

In this form of embodiment the circuit 15 comprises a third on-load tap changer 30 with a diverter 301 that is also termed third diverter terminal 301, four switching terminals 302, also termed third switch terminals 302, and a moved contact system 303, also termed third moved contact system 303.

The third switch terminals 302 are respective associated with the third taps 29 and directly connected therewith and are also termed third step terminals. The third moved contact system 303 is connected with the third diverter terminal 301 and can be selectably brought into electrical contact with each of the third step terminals 302.

In this form of embodiment the first diverter terminal 161 is connected not with the second plant terminal 102, but with the third diverter terminal 301.

The third that is uppermost in FIG. 10, tap 29 is connected with the upper, second end of the third control winding 28 and the lowermost third tap 29 is connected with the second end of the third control winding 28 or forms this second end.

Figure 11:
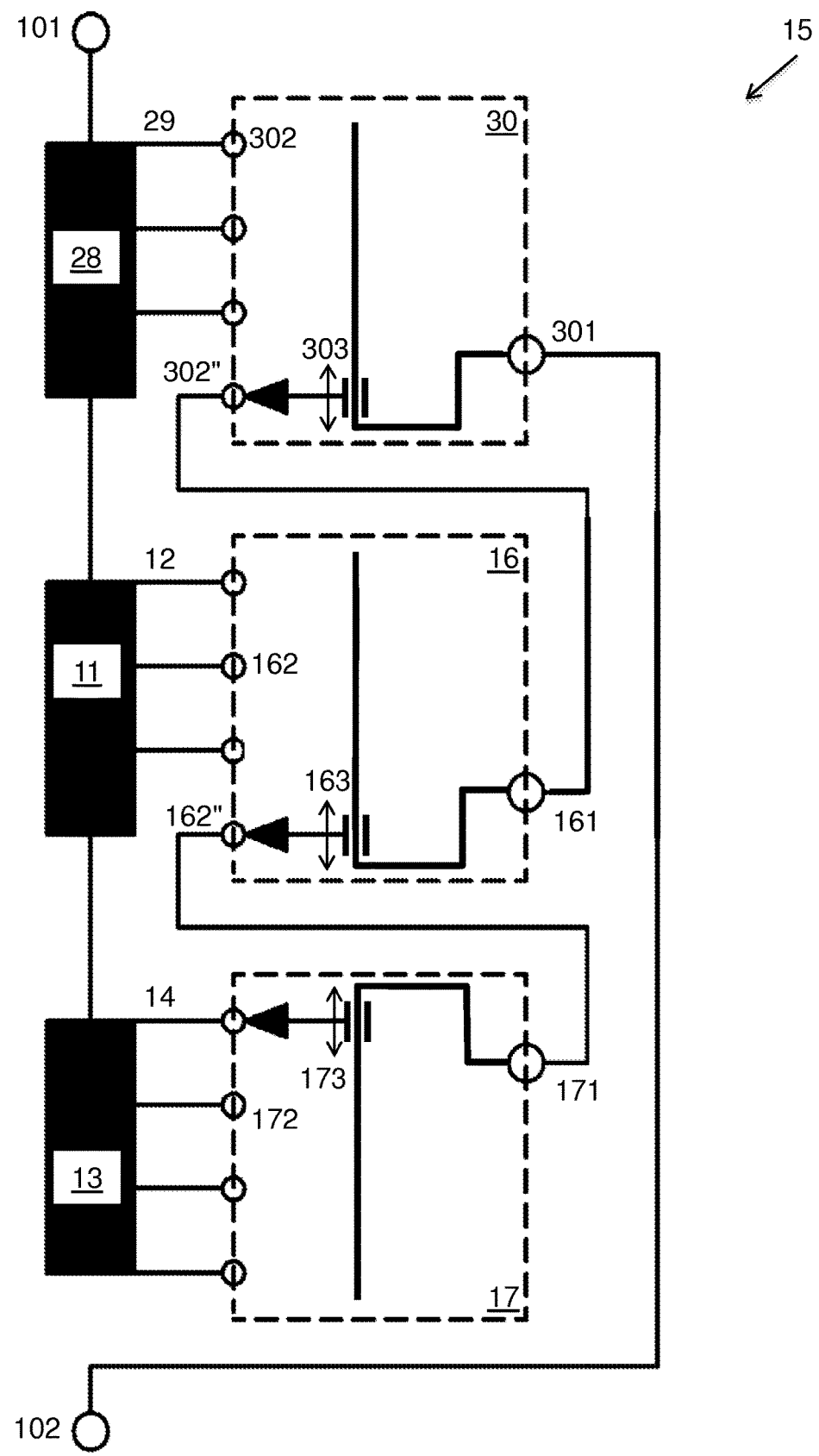
FIG. 11 shows a ninth form of embodiment of the plant with a seventh form of embodiment of the circuit.

A ninth form of embodiment of the plant 10 is schematically illustrated in FIG. 11. This form of embodiment is similar to the sixth form of embodiment of FIG. 6, so that in the following primarily the differences are explained in more detail.

In this form of embodiment the plant 10 comprises a third control winding 28 with three third taps 29, which winding is serially connected between the first plant terminal 101 and the first end of the first control winding 11 and is seated on the common magnet core so that all three control windings 11, 13, 28 are inductively coupled and conduct the same magnetic flux.

In this form of embodiment the circuit 15 is constructed in accordance with a seventh form of embodiment that is similar to the sixth form of embodiment of FIG. 10, so that in the following primarily the differences are explained in more detail.

In this form of embodiment the third on-load tap changer 30 is constructionally identical with the first on-load tap changer 16 and analogously thereto connected with the third control winding 28. The third that is lowermost in FIG. 11, switch terminal 302" forms a third connecting terminal 302".

The first diverter terminal 161 is connected not with the second plant terminal 102, but with the third connecting terminal 302". The third diverter terminal 301 is connected with the second plant terminal 102.

Figure 12:
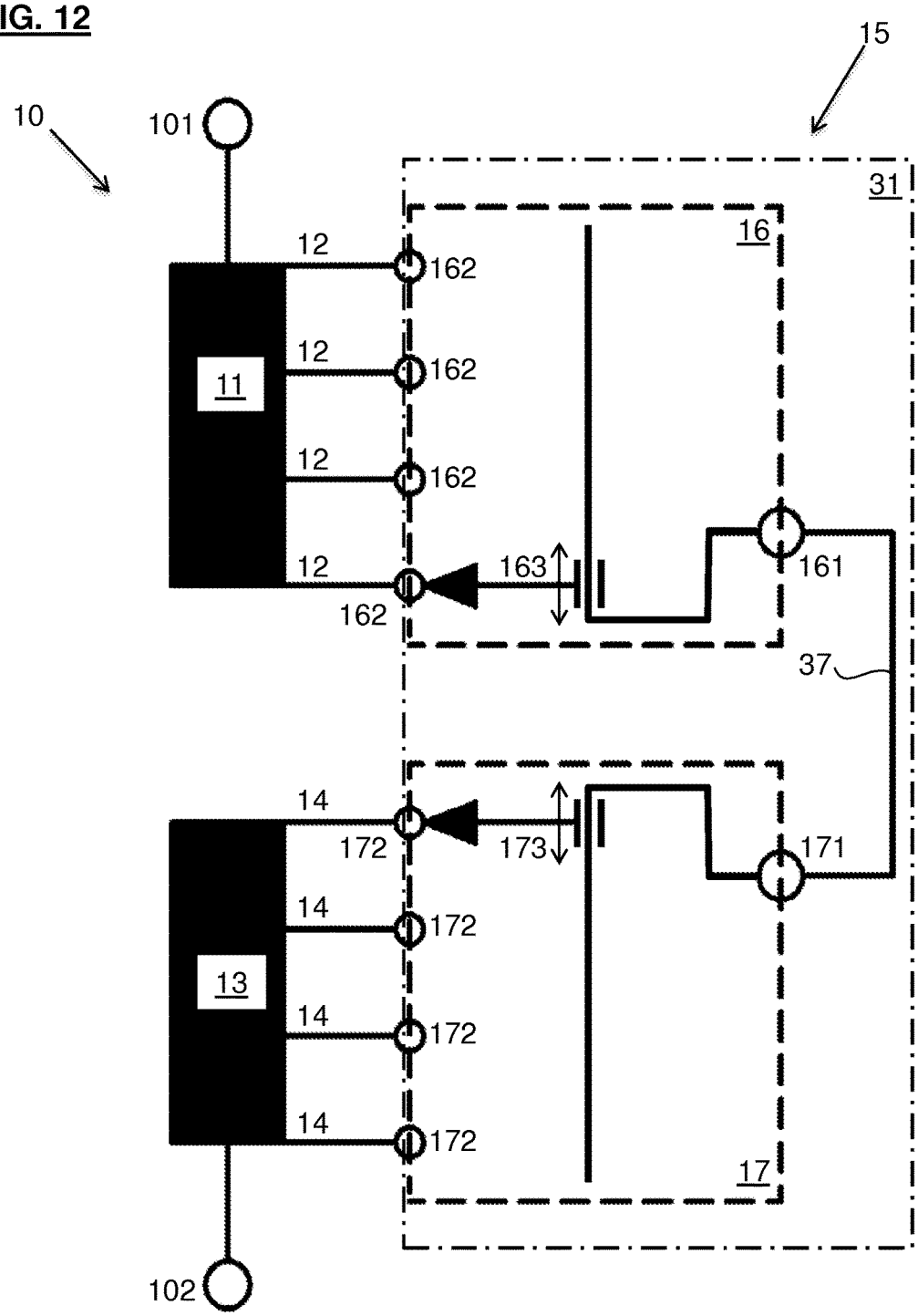
FIG. 12 shows a tenth form of embodiment of the plant with an eighth form of embodiment of the circuit.

A tenth form of embodiment of the plant 10 is schematically illustrated in FIG. 12. This form of embodiment is similar to the first form of embodiment of FIG. 1, so that in the following primarily the differences are explained in more detail.

In this form of embodiment the circuit 15 is constructed in accordance with an eighth form of embodiment that is similar to the first form of embodiment of FIG. 1, so that in the following primarily the differences are explained in more detail.

In this form of embodiment the circuit 15 comprises single switching apparatus 31 with a frame (not illustrated), on which the on-load tap changers 16, 17 are mounted. The on-load tap changers 16, 17 are thus combined as a constructional unit in the common switching apparatus 31 and are realized and formed by this. The switching apparatus 31 has, as interfaces outwardly, the switch terminals 162, 172, at which it is connected with the taps 12, 14.

Figure 13:
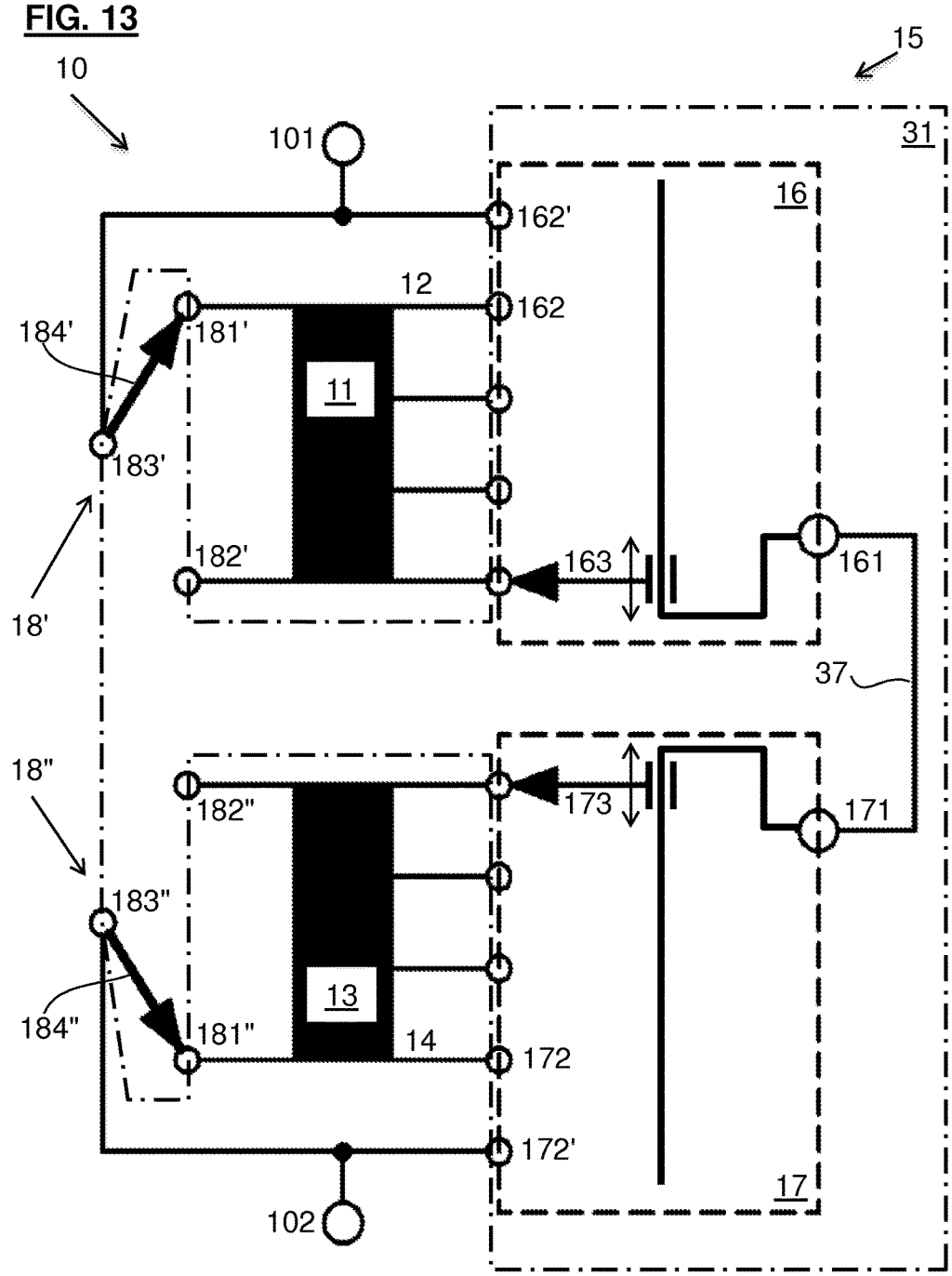
FIG. 13 shows an eleventh form of embodiment of the plant with a ninth form of embodiment of the circuit.

An eleventh form of embodiment of the plant 10 is schematically illustrated in FIG. 13. This form of embodiment is similar to the second form of embodiment of FIG. 2, so that in the following primarily the differences are explained in more detail.

In this form of embodiment the circuit 15 is constructed in accordance with a ninth form of embodiment that is similar to the form of embodiment of FIG. 2, so that in the following primarily the differences are explained in more detail.

In this form of embodiment the circuit 15 comprises single switching apparatus 31 with a frame (not illustrated) on which the on-load tap changers 16, 17 inclusive of the preselectors 18', 18" thereof are mounted. The on-load tap changers 16, 17 are thus combined as a constructional unit in the common switching apparatus 31 and are realized and formed by this. The switching apparatus 31 has as interfaces in outward direction the switch terminals 162, 162', 172, 172', at which it is connected with the taps 12, 14 and the first and second plant terminals 101, 102, as well as the first and second preselector terminals 181', 181", 182', 182" and the base terminals 183', 183", at which it is connected with the ends of the control windings 11, 13 and the first and second plant terminals 101, 102.

Figure 14:
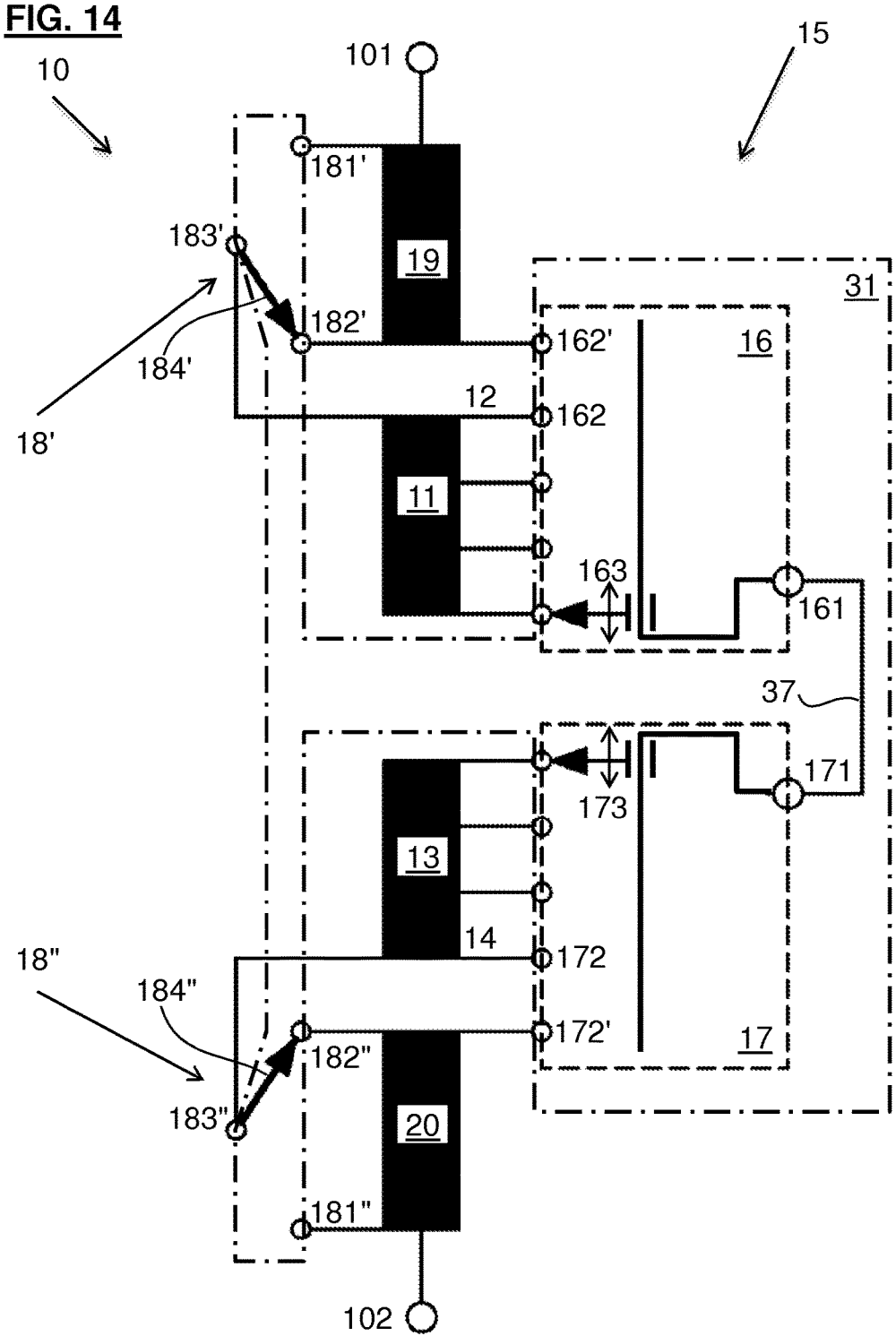
FIG. 14 shows a twelfth form of embodiment of the plant with a tenth form of embodiment of the circuit.
Figure 15:
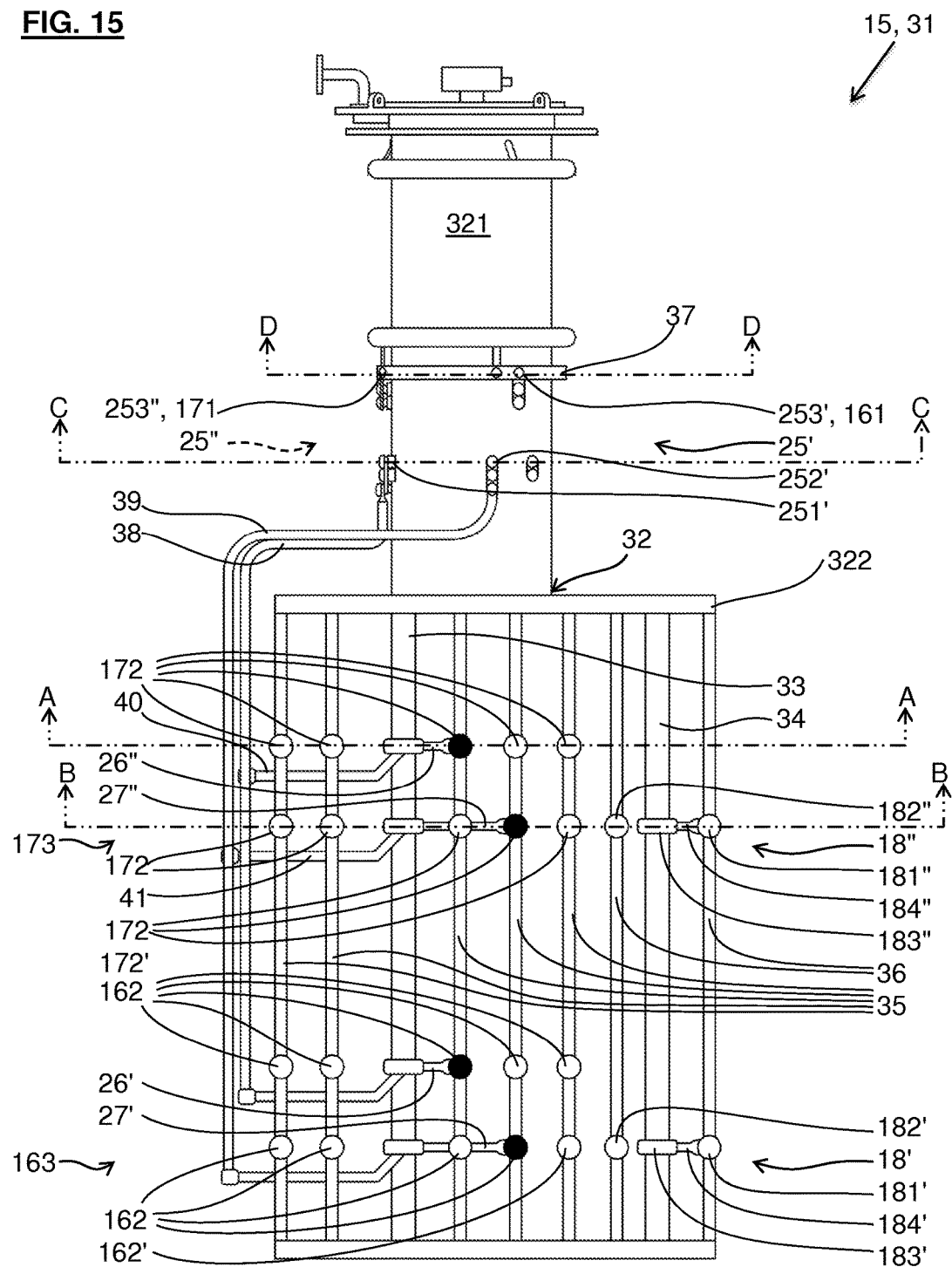
FIG. 15 shows an eleventh form of embodiment of the circuit.
Figure 16:
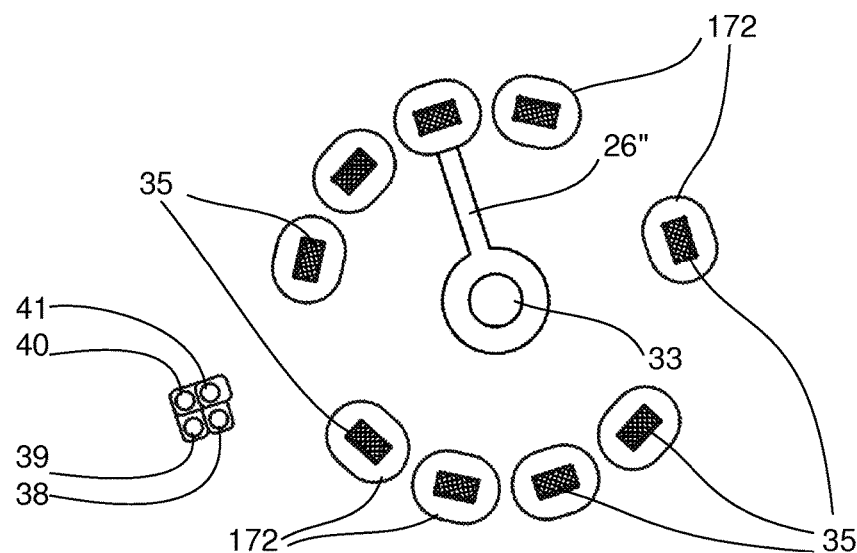
FIG. 16 shows a section along the axis A-A.
Figure 17:
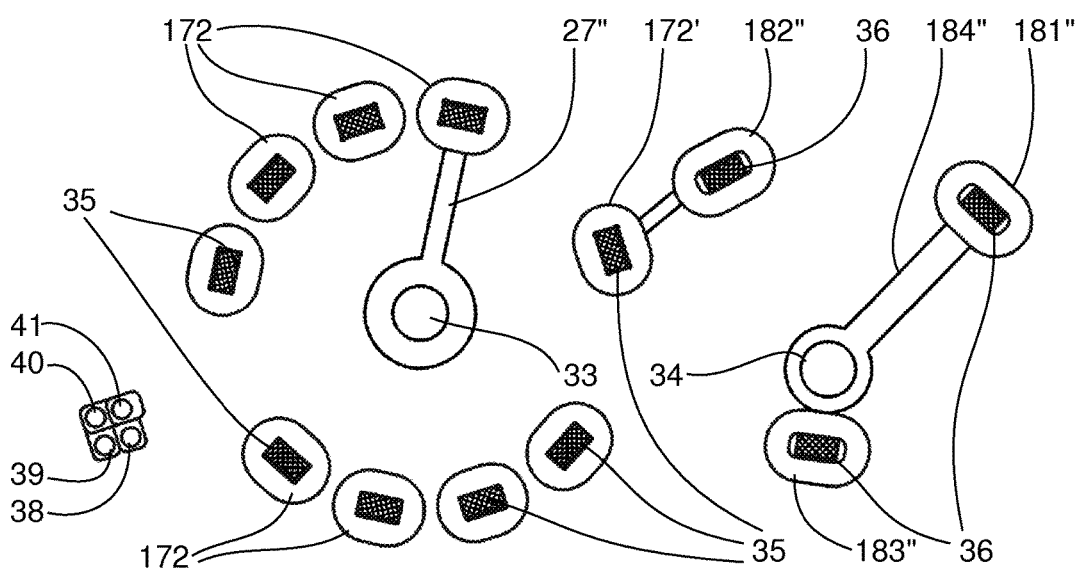
FIG. 17 shows a section along the axis B-B.

A twelfth form of embodiment of the plant 10 is schematically illustrated in FIG. 14. This form of embodiment is similar to the third form of embodiment of FIG. 13, so that in the following primarily the differences are explained in more detail.

In this form of embodiment the circuit 15 is constructed in accordance with a tenth form of embodiment that is similar to the third form of embodiment of FIG. 3, so that in the following primarily the differences are explained in more detail.

In this form of embodiment the circuit 15 comprises single switching apparatus 31 with a frame (not illustrated) on which the on-load tap changers 16, 17 inclusive of the preselectors 18', 18" thereof are mounted. The on-load tap changers 16, 17 are thus combined as a constructional unit in the common switching apparatus 31 and are realized and formed by this. The switching apparatus 31 has as interfaces in outward direction the switch terminals 162, 162', 172, 172', at which it is connected with the taps 12, 14 and the second ends of the coarse windings 19, 20 as well as the first and second preselector terminals 181', 181", 182', 182" and the base terminals 183', 183", at which it is connected with the ends of the coarse windings 19, 20 and the first ends of the control windings 11, 13.

In one form of embodiment (not illustrated) the three on-load tap changers 16, 17, 30 of the circuit 15 that is constructed in accordance with the sixth form of embodiment of FIG. 10 or the seventh form of embodiment of FIG. 11, are combined as a constructional unit in the common switching apparatus 31 and are realized and formed by this.

An eleventh form of embodiment of the circuit 15 is schematically illustrated in FIGS. 15, 16, 17, 18 and 19 that is similar to the tenth form of embodiment of FIG. 14, so that in the following primarily the differences are explained in more detail.

In this form of embodiment each on-load tap changer 16/17 is constructed in accordance with the first form of embodiment of FIG. 8, but comprises seventeen first switch terminals 162, seventeen second switch terminals 172 and in accordance with the tenth form of embodiment of FIG. 14 also the preselectors 18'/18" constructed as coarse selectors. The frame 32 comprises a load changeover switch frame 321, on which the load changeover switches 25', 25" are mounted, and a selector frame 322, on which the selectors 163, 173 are mounted one above the other. The load changeover switch frame 321 is constructed as a cylindrical oil tank of electrically insulating material that is filled with insulating oil and that receives the load changeover switches 25', 25" in its interior. The selector frame 322 is fastened to the underside of the load changeover switch frame 321 and comprises a selector axle 33, a preselector axle 34 and a cage-like frame with vertical selector rods 35 of electrically insulating material and vertical preselector rods 36 of electrically insulating material.

The selector rods 35 are arranged on a first circle around the selector axle 33 and the preselector rods 36 are arranged on a second circle around the preselector axle 34. The selector arms 26', 26", 27', 27" are rotatably mounted one above the other on the selector axle 33 and the load changeover switch arms 254', 254" are rotatably mounted one above the other on the preselector axle 34. In each selector 163/173, the switch terminals 162/172 associated with a respective first selector arm 26'/26" are fastened to the selector rods 35 in a plane in which this first selector arm 26'/26" lies and the switch terminals 162/172 associated with the respective second selector arm 27'/27" and the commutation terminal 162'/172' associated with the respective second selector arm 27'/27" are fastened to the selector rods 35 in a plane in which this second selector arm 27'/27" lies. In each preselector 18'/18" the preselector terminals 181'/182'/181"/182" associated with the respective moved contact 184'/184" and the base terminal 183'/183" associated with the respective moved contact 184'/184" are fastened to the preselector rods 26 in a plane in which this moved contact 184'/184" lies. The first commutation terminal 162' is connected with the second preselector terminal 182' of the first preselector 18' and the second commutation terminal 172' is connected with the second preselector terminal 182" of the second preselector 18.

Figure 18:
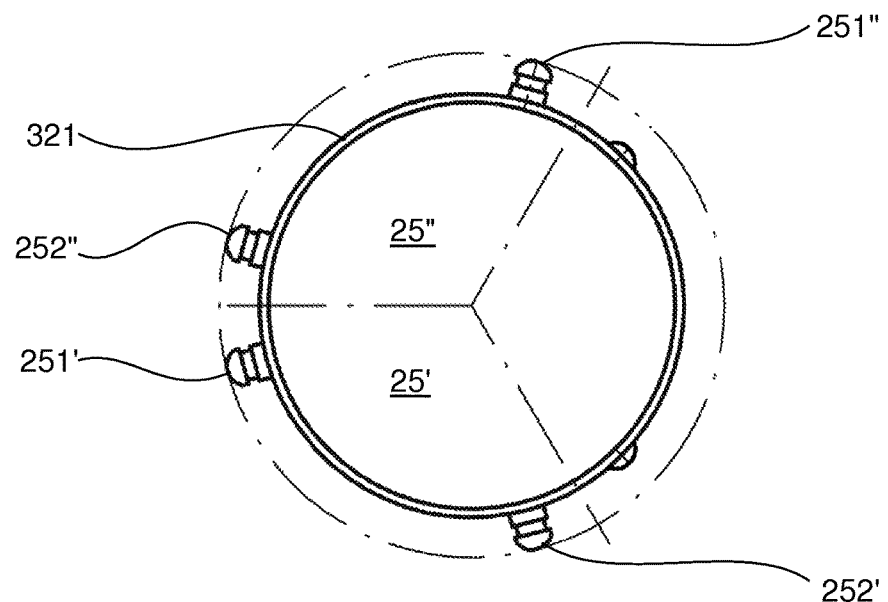
FIG. 18 shows a section along the axis C-C.
Figure 19:
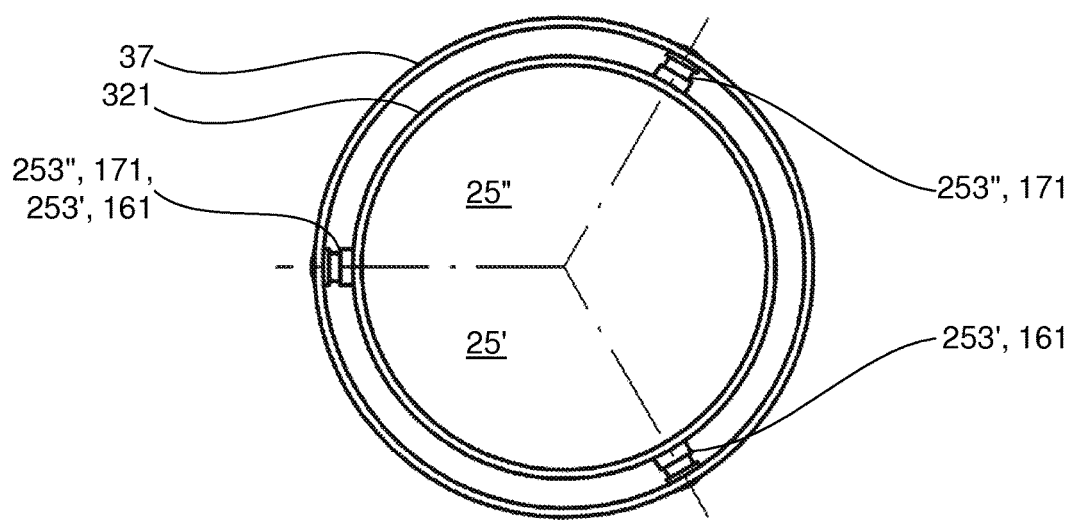
FIG. 19 shows a section along the axis D-D.

The cylindrical on-load tap changer frame 321 is symmetrically divided into three 120° sectors of which the sector that is lower in FIGS. 18 and 19, receives the first load changeover switch 25' and the upper sector receives the second load changeover switch 25". In the wall of the load changeover switch frame 321 the changeover switch terminal 251' of the first load changeover switch 25' is fastened in a lower plane in the lower sector near the lower sector near the upper sector, the second changeover switch terminal 252' of the first changeover switch 25' is fastened in the lower sector near the right-hand sector, the first changeover switch terminal 251" of the second load changeover switch 25" is fastened in the upper sector near the right-hand sector and the second changeover switch 252" of the second load changeover switch 25" is fastened in the upper sector near the lower sector. In the wall of the load changeover switch frame 321 three terminals are fastened in an upper plane on the sector boundaries, of which the terminal lower in FIG. 19 serves as base terminal 253' of the first load changeover switch 25' and as first diverter terminal 161, the upper terminal serves as base terminal 253" of the second load changeover switch 25" and as second diverter terminal 171 and the lefthand terminal serves not only as base terminal 253' of the first load changeover switch 25' and as first diverter terminal 161, but also as base terminal 253" of the second load changeover switch 25" and as second diverter terminal 171. A diverter ring 37 is connected with these three terminals and thus serves as connecting line 37 between the diverter terminals 161, 171.

An on-load tap changer with a selector frame of such a kind and a load changeover switch of such a kind are marketed, for example, by Maschinenfabrik Reinhausen GmbH, Germany, under the name 'VACUTAP (Registered Trade Mark) VRG 11 1302'.

A first connecting line 38 is connected with the first selector arm 26' of the first selector 163 and the first changeover switch terminal 251' of the first load changeover switch 25'. A second connecting line 39 is connected with the second selector arm 27' of the first selector 163 and the second changeover switch terminal 252' of the first load changeover switch 25'. A third connecting line 40 (partly covered in FIG. 15 by the second connecting line 39) is connected with the first selector arm 26" of the second selector 173 and the first changeover switch terminal 251" of the second load changeover switch 25". A fourth connecting line 41 (partly covered in FIG. 15 by the first connecting line 38) is connected with the second selector arm 27" of the second selector 173 and the second changeover switch terminal 252" of the second load changeover switch 25".

The selector frame 322 can, however, also be of different construction and comprise, for example, instead of the selector rods 35 and/or preselector rods 36 a unitary cylinder of electrically insulating material to which the switch terminals and/or the commutation terminals and/or the preselector terminals and/or the base terminals are fastened. An on-load tap changer with a selector frame of that kind is marketed by, for example, ABB AB, Sweden, under the name 'VUCG', wherein this on-load tap changer also comprises a third selector that is mounted between the two other selectors on the selector frame.

The selector frame 322 can, for example, comprise instead of the selector rods 35 and/or preselector rods 36 part-cylindrical or semi-cylindrical segments of electrically insulating material, to which the switch terminals and/or the commutation terminals and/or the preselector terminals and/or the base terminals are fastened.

The on-load tap changer frame 321 can, however, also be of different construction and, for example, be divided symmetrically into three mutually adjacent columns, of which a first column that for example is an outer column, receives the first load changeover switch 25' and a second column that is for example the other outer column or the middle column, receives the second load changeover switch 25". An on-load tap changer with a load changeover switch frame of that kind is marketed by, for example, ABB AB, Sweden, under the name 'VUCG', wherein this on-load tap changer also comprises a third load changeover switch that the remaining, third column receives.

The plant 10 according to the invention, the circuit 15 according to the invention and the switching apparatus 31 according to the invention can be produced with, for example, use of the above-mentioned on-load tap changer 'VACUTAP (Registered Trade Mark) VRG 11 1302' or the above-mentioned on-load tap changer 'VUCG'.

REFERENCE NUMERALS

10 electrical plant, compensating choke, regulating transformer
101/102/103/104 first/second/third/fourth plant terminal of 10
11 first control winding
12 first taps, taps of 11
13 second control winding
14 second taps, taps of 13
15 circuit
16 first on-load tap changer
161 diverter terminal of 16, first diverter terminal
162 switch terminals of 16, first switch terminals
162' commutation terminal of 16, first commutation terminal
162" connecting terminal of 16, first connecting terminal
163 moved contact system of 16, first moved contact system, first selector
17 second on-load tap changer
171 diverter terminal of 17, second diverter terminal
172 switch terminals of 17, second switch terminals
172' commutation terminal of 17, second commutation terminal
173 moved contact system of 17, second moved contact system, second selector
18/18'/18" common/first/second preselector 181/182/183/184 first/second preselector terminal/base terminal/moved contact of 18
181'/182'/183'/184' first/second preselector terminal/base terminal/moved contact of 18'
181"/182"/183"/184" first/second preselector terminal/base terminal/moved contact of 18"
19 first coarse winding
20 second coarse winding
21 primary side of 10
22 secondary side of 10
23 first main winding
24 second main winding
25'/25" first/second load changeover switch
251'/252'/253' first/second changeover switch terminal/base terminal of 25'
251"/252"/253" first/second changeover switch terminal/base terminal of 25"
26'/26" first selector arm of 163/173
27'/27' second selector arm of 163/173
28 third control winding
29 third taps, taps of 28
30 third on-load tap changer
301 diverter terminal of 30, third diverter terminal
302 switch terminals of 30, third switch terminals
302" connecting terminal of 30, third connecting terminal
303 moved contact system of 30, third moved contact system
31 switching apparatus
32 frame
321 load changeover switch frame of 32
322 selector frame of 32
33 selector axle of 322
34 preselector axle of 322
35 selector rods of 322
36 preselector rods of 322
37 diverter ring, connecting line between 161 and 171
38 first connecting line
39 second connecting line
40 third connecting line
41 fourth connecting line

The invention claimed is:

1. A circuit for an electrical plant with a first and a second control winding, the circuit comprising:
a first on-load tap changer with a first diverter terminal and three first switch terminals of which at least two can be connected with respective first taps of the first control winding, one of the three first switch terminals not being directly connected with one of the taps and forming a connecting terminal; and
a second on-load tap changer with a second diverter terminal and three second switch terminals of which at least two can be connected with respective second taps of the second control winding, the second diverter terminal being connected with the connecting terminal but not being connected with the first diverter terminal.

2. The circuit according to claim 1, further comprising:
a third on-load tap changer with a third diverter terminal and three third switch terminals of which at least two are connectable with respective third taps of a third control winding of the plant, the second diverter terminal being connected with one of the first switch terminals not associated with a first tap, the first diverter terminal being connected with the third diverter terminal or with a third diverter terminal not associated with a third tap.

3. The circuit according to claim 1, wherein
at least one of the on-load tap changers has a respective preselector with two preselector terminals and a base terminal.

4. The circuit according to claim 3, wherein
the preselector is a reverser;
the preselector terminals are connectable with ends of the control winding associated with the respective on-load tap changer; and
the base terminal is connectable with a first plant terminal of the plant or with an end of a main winding inductively coupled with a control winding thereof.

5. The circuit according to claim 3, wherein
the preselector is a coarse selector;
the base terminal can be connected with an end of the control winding associated with the respective on-load tap changer; and
the preselector terminals can be connected with the ends of a coarse winding inductively coupled with a control winding thereof.

6. The circuit according to claim 1, wherein
the first and second on-load tap changers are coupled to switch in the same sense and synchronously and, when switching, the first and second on-load tap changers both increase or both decrease an effective winding number with respect to magnetic flux.

7. The circuit according to claim 1, wherein
the first and second on-load tap changers are combined in a common switching apparatus or are realized or formed by a common switching apparatus.

8. An electrical plant comprising a circuit according to claim 1.

9. The plant according to claim 8, further comprising:
a third control winding with two third taps, the second diverter terminal being connected with the first switch terminal not respective with a first tap;
a third on-load tap changer with a third diverter terminal and three third switch terminals of which at least two are connected with respective third taps, the first diverter terminal being connected with the third diverter terminal or with a third switch terminal not associated with a third tap.

10. The plant according to claim 8, further comprising:
a main winding inductively coupled with at least one of the control windings.

11. The plant according to claim 8, wherein at least of the two control windings are associated with the same phase.

12. The plant according to claim 8 that is constructed as a compensation choke or forms at least part of a compensation choke.

* * * * *